United States Patent [19]

Tsukagoshi

[11] Patent Number: 5,583,577
[45] Date of Patent: Dec. 10, 1996

[54] CAPTION DATA CODING/DECODING SYSTEMS AND METHODS THAT INCLUDES KEY DATA INDICATING INTERMEDIATE LEVELS OF ATTENUATION IN THE VICINITY OF THE CAPTION

[75] Inventor: Ikuo Tsukagoshi, Tokyo, Japan

[73] Assignee: Sony Corporation, Tokyo, Japan

[21] Appl. No.: 387,904

[22] PCT Filed: Jun. 30, 1994

[86] PCT No.: PCT/JP94/01062

§ 371 Date: Apr. 3, 1995

§ 102(e) Date: Apr. 3, 1995

[87] PCT Pub. No.: WO95/01704

PCT Pub. Date: Jan. 12, 1995

[30] Foreign Application Priority Data

Jun. 30, 1993 [JP] Japan .................................. 5-160782
Jan. 25, 1994 [JP] Japan .................................. 6-006390

[51] Int. Cl.⁶ .................................................. H04N 7/08
[52] U.S. Cl. .......................................... 348/468; 348/564
[58] Field of Search ..................................... 348/465, 461, 348/467, 468, 564, 589, 600; H04N 7/08

[56] References Cited

U.S. PATENT DOCUMENTS 5,138,450  8/1992  Fukuda et al. .................... 348/564
5,467,142  11/1995  Ichinokawa ...................... 348/468

OTHER PUBLICATIONS

"Broadcast Teletext Specification" Sep. 1976; BBC; pp. 1–20.

*Primary Examiner*—Victor R. Kostak
*Attorney, Agent, or Firm*—Limbach & Limbach L.L.P.

[57] ABSTRACT

A caption coding method is for coding a caption, represented by caption data, to be superimposed on a video image for display. Caption data, representing the caption to be superimposed on the video image for display, is coded. Key data is coded to have a value corresponding to one of a maximum attenuation rate, a minimum attenuation rate, and one or more intermediate attenuation rates between the maximum attenuation rate and the minimum attenuation rate, of portions of the video image in a vicinity of the caption. The coded caption data and the coded key data are combined with video image data that represents the video image, to generate a combined image signal.

74 Claims, 24 Drawing Sheets

/* vlc.table2 */

| vlc code | RL | BL (*) |
|---|---|---|
| 11111110 | End Of Line | 8 |
| 0 | 0 | 1 |
| 1100 | 1 | 4 |
| 11010 | 2 | 5 |
| 110110 | 3 | 6 |
| 110111 | 4 | 6 |
| 111000 | 5 | 6 |
| 111001 | 6 | 6 |
| 1110100 | 7 | 7 |
| 1110101 | 8 | 7 |
| 1110110 | 9 | 7 |
| 11101110 | 10 | 8 |
| 11101111 | 11 | 8 |
| 11110000 | 12 | 8 |
| 11110001 | 13 | 8 |
| 11110010 | 14 | 8 |
| 111100110 | 15 | 9 |
| 111100111 | 16 | 9 |
| 111101000 | 17 | 9 |
| 111101001 | 18 | 9 |
| 111101010 | 19 | 9 |
| 111101011 | 20 | 9 |

| vlc code | RL | BL |
|---|---|---|
| 111101100 | 21 | 9 |
| 111101101 | 22 | 9 |
| 111101110 | 23 | 9 |
| 111101111 | 24 | 9 |
| 1111100000 | 25 | 10 |
| 1111100001 | 26 | 10 |
| 1111100010 | 27 | 10 |
| 1111100011 | 28 | 10 |
| 1111100100 | 29 | 10 |
| 1111100101 | 30 | 10 |
| 1111100110 | 31 | 10 |
| 1111100111 | 32 | 10 |
| 1111101000 | 33 | 10 |
| 1111101001 | 34 | 10 |
| 1111101010 | 35 | 10 |
| 1111101011 | 36 | 10 |
| 1111101100 | 37 | 10 |
| 1111101101 | 38 | 10 |
| 1111101110 | 39 | 10 |
| 1111101111 | 40 | 10 |

FIG. 9A      FIG. 9B

| | | |
|---|---|---|
| 11111100000 | 41 | 11 |
| 11111100001 | 42 | 11 |
| 11111100010 | 43 | 11 |
| 11111100011 | 44 | 11 |
| 11111100100 | 45 | 11 |
| 11111100101 | 46 | 11 |
| 11111100110 | 47 | 11 |
| 11111100111 | 48 | 11 |
| 11111101000 | 49 | 11 |
| 11111101001 | 50 | 11 |
| 11111101010 | 51 | 11 |
| 11111101011 | 52 | 11 |
| 11111101100 | 53 | 11 |
| 11111101101 | 54 | 11 |
| 11111101110 | 55 | 11 |
| 11111101111 | 56 | 11 |
| 100100011011 | 57 | 12 |
| 100100011100 | 58 | 12 |
| 100100011101 | 59 | 12 |
| 100100011110 | 60 | 12 |

FIG. 9C

| | | |
|---|---|---|
| 100100011111 | 61 | 12 |
| 100100100000 | 62 | 12 |
| 100100100001 | 63 | 12 |
| 100100100010 | 64 | 12 |
| 100100100011 | 65 | 12 |
| 100100100100 | 66 | 12 |
| 100100100101 | 67 | 12 |
| . . . . . | | |
| 101111111010 | 714 | 12 |
| 101111111011 | 715 | 12 |
| 101111111100 | 716 | 12 |
| 101111111101 | 717 | 12 |
| 101111111110 | 718 | 12 |
| 101111111111 | 719 | 12 |

(*)RL: Run Length of input data
BL: Bit Length of vlc code

FIG. 9D

FIG. 10B TRn-2

FIG. 10C TRn-1

FIG. 10D TRn

N = NUMBER OF FRAMES TO WIPE COLOR

CAPTION DATA CODING/DECODING SYSTEMS AND METHODS THAT INCLUDES KEY DATA INDICATING INTERMEDIATE LEVELS OF ATTENUATION IN THE VICINITY OF THE CAPTION

TECHNICAL FIELD

The present invention relates to caption data coding/decoding systems and methods and, particularly, to caption data coding and decoding methods, caption data coding and decoding systems, a recording medium, a transmission method and system, coding and decoding methods, and coding and decoding systems, which are suitably used for transmitting video data along with caption data and displaying the caption superimposed on the video image at the receiving side.

BACKGROUND ART

On the one hand, for instance, when foreign movies are showed in a country, a caption is often superimposed on the screen. As a caption data transmission system of this type, in a video disk or usual television broadcast, a video signal is transmitted with a caption being previously superimposed on a video image.

On the other hand, for instance, in the CAPTAIN system, a caption can be transmitted as a character code or dot pattern.

Further, in CD-G, graphics can be recorded using a subcode, which can be utilized to record a caption on a CD.

In CD-G, on the one hand, as shown in FIG. 26, data for one frame consists a 1-byte subcode and 32-byte data. In the 32-byte data, six samples, each consisting of two bytes, are assigned to L and R channels, respectively. Thus, the total is 24 bytes. For this 24-byte audio data, an 8-byte error correction code is added to form data of 32 bytes in total.

On the other hand, the subcodes for 98 frames are collected to form one block. The subcodes for the first two frames of the subcodes for the 98 frames are sync patterns S0 and S1. Various subcode data can be recorded in the subcodes for the remaining 96 frames. However, data for a track search is already assigned to the data of the P-channel and Q-channel of the 1-byte subcode (the individual bits are represented by P to W). Thus, graphics data can be assigned to the remaining R-channel to W-channel of 6 bits. That is, the extent to which graphics data can effectively assigned is 6×96 bits.

Since the data for one block is transmitted at a frequency of 75 Hz, the amount of data transmitted for one frame is 75×98 Hz. Consequently, the transmission bit rate of a subcode is 7.35 k bytes/s.

FIG. 27 shows the transmission format for such graphics data. As shown in the same figure, the data for six bits of R-channel to W-channel forms one symbol, and the data for 96 symbols constructs a packet which consists of four packs. Each pack is made up of 24 symbols, symbols 0 to symbols 23. Mode information is assigned to three bits, R, S, and T, of symbol 0, and item information is assigned to three bits, U, V, and W, of symbol 0. The combination of the mode and item, the following modes are defined.

| MODE | ITEM | |
|------|------|---|
| 000 | 000 | 0 mode |
| 001 | 000 | graphics mode |
| 001 | 001 | TV-graphics mode |
| 111 | 000 | user mode |

Since an instruction is assigned to symbol 1, and the parities for the mode plus item and instruction are assigned to symbol 2 and symbol 3, respectively, the extent to which graphics data can be assigned is 16 symbols, symbol 4 to symbol 19. The parities for the 20 symbols from symbol 0 to symbol 19 are assigned to the four symbols from symbol 20 to symbol 23.

In CD-G, graphics data can thus be assigned as binary data to the extent of 6×12 pixels for each pack. The pack rate is 75×4=300 packs/s. Accordingly, if one character is assigned to the extent of 6×12 pixels, 300 characters can be transmitted per second.

Since one screen defined in CD-G is 288 horizontal pixels×192 lines, it takes 2.56 seconds to transmit the characters for this one screen, as shown by the following equation:

$$(288/6)\times(192/12)/300=2.56 \tag{1}$$

To provide a hexadecimal representation in each pixel takes 10.24 seconds, a time four times that of the above, because it is required that a different pattern be transmitted four times for one character pattern.

On the one hand, of these conventional methods, a method for transmitting a caption superimposed on a video image, such as a method on a video disk or the usual television broadcast, has a problem in that the user cannot switch the caption on or off as necessary. In addition, there is a problem in that it is not possible to prepare captions for a number of different languages so that the user can choose a desired one.

On the other hand, the method in the CAPTAIN system or CD-G has a problem in that the caption can be switched on or off as necessary, but the resolution is not sufficient.

That is, in the CAPTAIN system, the region available for the display of one screen is 248 horizontal pixels×192 lines, but a component digital TV signal has a resolution of 720 horizontal pixels×480 lines, and it is thus clearly that it is not sufficient when compared with the above resolution.

Further, in CD-G, since data of only one bit can be made to correspond to each pixel, data is represented in a binary form, and there is a problem in that, for instance, an aliasing phenomenon in which the slanted line portions of a character are notched, or a flicker phenomenon becomes marked, which is unpleasant for the view.

Moreover, binary information may be converted to multivalued information, for instance, by a filter, but it requires a high-precision filter, which is expensive. Also, the use of such a filter would degrade the background image as well.

In addition, if a pixel is represented by a hexadecimal value in CD-G, there is a problem in that it requires a time about four times that taken for binary representation, as described above, and it is thus difficult to switch the display of a caption at high speed.

The present invention was accomplished in view of the foregoing, enabling a high-quality caption to be displayed as desired by the user. In addition, it is to enable the display of a caption to be switched at high speed without degrading the video image in the background.

DISCLOSURE OF INVENTION

The caption data coding method and system of the present invention is characterized by generating caption data corresponding to a caption to be superimposed on a video image for display and key data corresponding to a superimposing rate for superimposing the caption on the video image, quantizing the caption data and the key data, and transmitting the quantized caption and key data as predetermined bits.

The caption data decoding method and system of the present invention is characterized in that, in a caption data decoding method for decoding the caption data coded by the above described caption data coding method, the attenuation rate of the video image is made minimum when the key data is the maximum or minimum data, the attenuation rate of the video image is made maximum when the key data is the minimum or maximum, and when the key data is a value between the minimum and the maximum, the attenuation rate of the video image is made to correspond to the magnitude of the value.

The transmission method and system of the present invention is characterized by generating key data corresponding to the attenuation rate of the video image for superimposing a caption to be superimposed on the video image for display on the video image, and transmitting the key data.

Further, the coding method of the present invention is characterized by generating key data corresponding to the attenuation rate of the video image for superimposing a caption to be superimposed on the video image on the video image, quantizing the key data, and transmitting the quantized key data as predetermined bits.

Also, the decoding method of the present invention is characterized in that, in a decoding method for decoding coded data, the attenuation rate of the video image is made minimum when the key data is the maximum or minimum data, the attenuation rate of the video image is made maximum when the key data is minimum or maximum, and when the key data is a value between the minimum and the maximum, the attenuation rate of the video image is made to correspond to the magnitude of the value.

In addition, the recording medium of the present invention is characterized by quantizing the key data corresponding to the attenuation of the video image for superimposing a caption to be superimposed on the video image for display on the video image, and recording it.

In the caption data coding method and system of the present invention, quantized caption data and key data are transmitted as predetermined bits. Further, in the transmission method and system of the present invention, key data is generated which corresponds to the attenuation rate of the video image for superimposing a caption to be superimposed on the video image for display on the video image, and the key data is transmitted. In addition, in the coding method and system of the present invention, key data is generated which corresponds to the attenuation rate of the video image for superimposing a caption to be superimposed on the video image for display on the video image, the key data is quantized, and the quantized key data is transmitted as predetermined bits. In consequence, a high-quantity caption can be displayed at high speed as necessary.

Moreover, in the caption data decoding method and system of the present invention, the attenuation rate of the video image is controlled so as to correspond to the value of the key data. In addition, in the decoding method and system of the present invention, the attenuation rate of the video image is made minimum when the key data is maximum or minimum data, the attenuation rate of the video image is made maximum when the key data is minimum or maximum, and when the key data is a value between the minimum and the maximum, the attenuation rate of the video image is made to correspond to the magnitude of the value. A clearer caption can thus be displayed. In the recording medium of the present invention, the key data, which corresponds to the attenuation rate of the video image for superimposing a caption to be superimposed on the video image for display on the video image, is recorded in a quantized form. As a consequence, the attenuation rate of the video image can be controlled according to the magnitude of the value of the key data, enabling reproduction of a clearer caption.

BRIEF DESCRIPTION OF THE DRAWINGS

FIGS. 9(A) to 9(D) are figures for explaining the variable length codes in the variable-length coding circuit 17 in FIG. 1.

FIGS. 10(A) to 10(D) are figures for explaining the chroma vectors generated by the vector generator circuit 23 in FIG. 1.

BEST MODE FOR CARRYING OUT THE INVENTION

Figure 1:
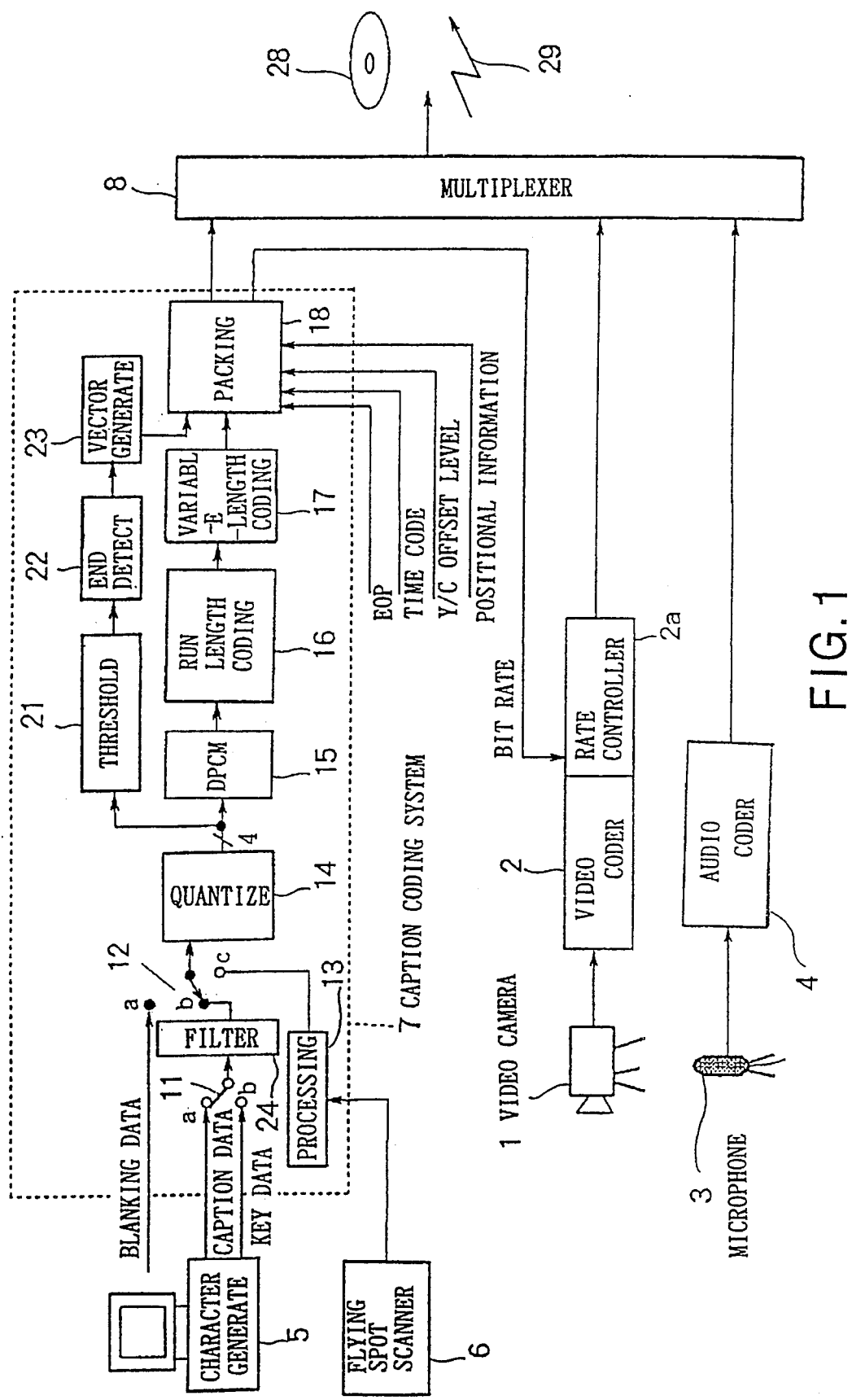
FIG. 1 is a block diagram showing the construction of an embodiment of the caption data coding system to which the caption data coding method of the present invention is applied.

FIG. 1 is a block diagram showing the construction of an embodiment of the system to which the caption data coding method of the present invention is applied. In this embodiment, the video signal output from a video camera 1 is supplied to a video coder 2, where it is converted from analog to digital and compressed. Of course, instead of the video camera 1, a video disk player or video tape recorder can be used so that the video signal reproduced from it is supplied to the video coder 2.

The video coding device 2 includes a rate controller 2a, which control the compression rate of video data according to the bit rate control signal output by a packing circuit 18. That is, caption data is coded in a caption coding system 7 as described later, but if the amount of the coded data is small, the total data amount does not increase even if the amount of video data to be coded is increased. That is, the video image can be given a higher quality accordingly. Conversely, if the amount of caption data is large, the amount of data assigned to the video data is decreased.

The video data compressed and coded by the video coder 2 in this way is supplied to a multiplexer 8.

Similarly, on the one hand, an audio signal collected by a microphone 3 is supplied to an audio coder 4 where it is converted from analog to digital, compressed, and coded. Also in this case, instead of the microphone 3, for instance, a tape recorder may be used so that the audio signal reproduced in it is supplied to the audio coder 4. The audio data coded by the audio coder 4 is supplied to the multiplexer 8.

On the other hand, the digital caption data generated by a character generator 5 or the analog caption data output from a flying spot scanner 6 is supplied to the caption data coding system 7, and after being compressed and coded, it is supplied to the multiplexer 8.

The multiplexer 8 multiplexes the input video data, audio data, and caption data, and records them on a disk 28 as a recording medium or transmits them to the receiving side through a transmission channel 29 as a transmission path.

The caption coding system 7 is now described in more detail. The character generator 5 generates caption data corresponding to the video image coded by the video coder 2, and supplies it to contact "a" of a switch 11 of the caption coding system 7. Also, key data is supplied by the character generator 5 to contact "b" of the switch 11. The switch 11 is switched to contact "a" or contact "b" at a predetermined timing to select caption data or key data as needed and supply it to a quantizer circuit 14 via contact "b" of a switch 12.

Figure 2A:
FIGS. 2(A) and 2(B) are figures for explaining the relationship between caption data and key data.
Figure 2B:
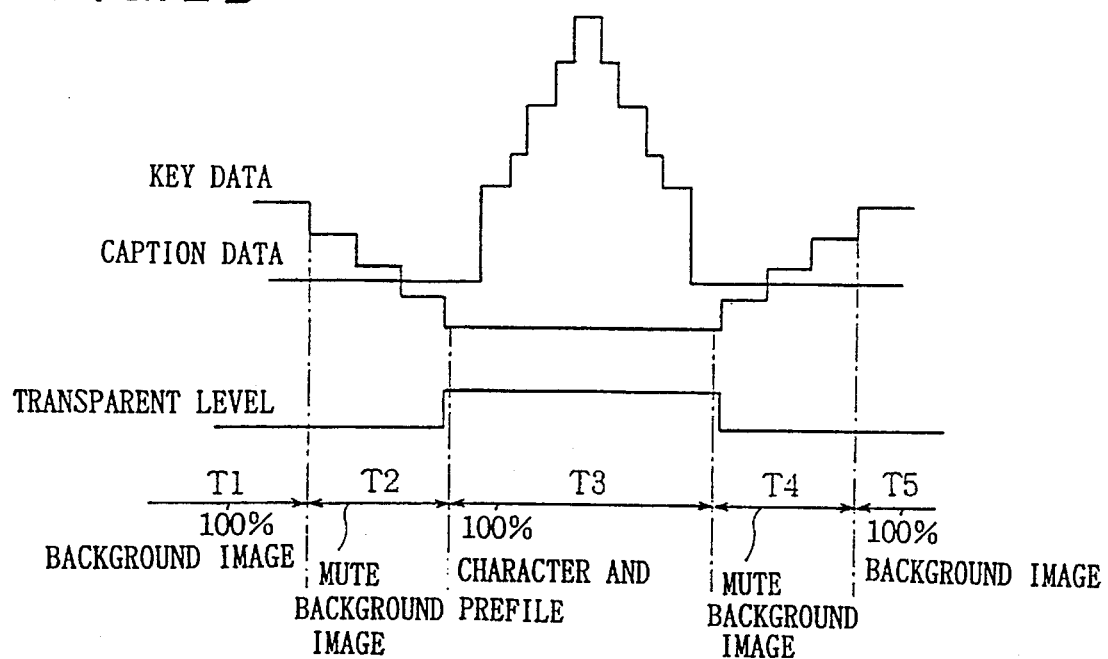

Now, with reference to FIG. 2, on the one hand, the relationship between key data and caption data is described. It is supposed that character "A" exists as a character to be displayed in the caption, as shown in FIG. 2(A). The caption data of the line (horizontal scanning line) represented by one horizontal line in the same figure is shown in FIG. 2(B). As shown in the same figure, the caption data has in period T3, a level corresponding to the brightness of the character to be displayed.

On the other hand, the key data has the highest level in periods T1 and T5 spaced rather away from period T3, before and after period T3. The level of period T2 between periods T1 and T3 and the level of period T4 between periods T3 and T5 are set to a predetermined level which is intermediate between the above described minimum level and maximum level. In period T2, the level is gradually changed from the maximum level to the minimum level and, in period T4, it is gradually changed from the minimum level to the maximum level.

That is, on the one hand, in period T3, caption data is coded in four bits, and the level of the video signal of the background video image is muted substantially to the black level. On the other hand, in periods T1 and T5, key data is coded in four bits, and the level of the caption signal corresponding to the caption is muted substantially to a predetermined level (in this embodiment, a gray level, although it may be a black level) and the background video image is directly displayed. In periods T2 and T4, key data is coded in four bits, and the background video image is attenuated according to the value of the key data. In this embodiment, the attenuation rate of the background video image decreases as the value of the key data increases, and the attenuation rate of the background video image increases as the value of the key data decreases. Thus, the background video image is substantially completely muted in the period for displaying a character, while in the vicinity of the character, the background video image is gradually muted to prevent the caption (character) from becoming unclear.

Figure 3:
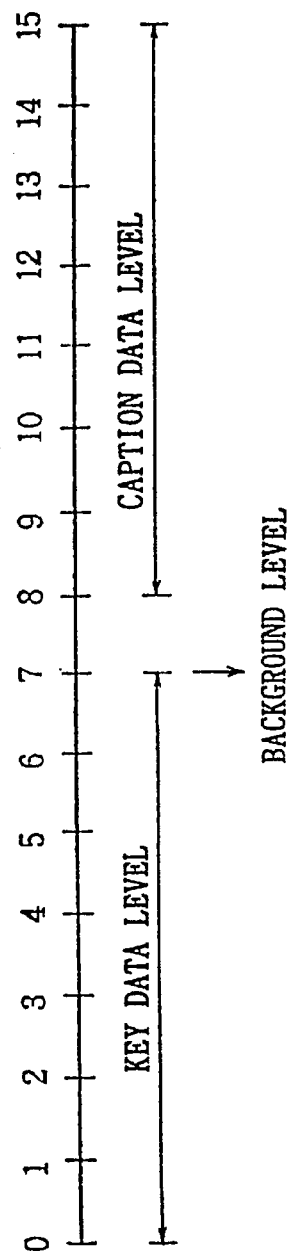
FIG. 3 is a figure for explaining the principle of coding caption data and key data.

The quantizer circuit 14 collectively represents the levels of caption data or key data as 4-bit data. FIG. 3 shows the principle of collectively representing the levels of caption data (fill data) and key data. As shown in the same figure, of the 16 levels which can be expressed by four bits, the eight levels from 0 to 7 are assigned to the levels of key data, and the eight levels from 8 to 15 are assigned to caption data. That is, the levels of key data are expressed by 4-bit data of "0000" to "0111", and the levels of caption data are expressed by 4-bit data of "1000" to "1111".

As a result, the MSB of the 4-bit data is the identifier for key data and caption data. That is, if the most significant bit (MSB) is "1", the remaining three bits represent a caption data level and caption data corresponding to this level is displayed and, if the MSB is "0", the remaining three bits represent a key data level, and only the background video image of a level corresponding to the key data value is displayed. When the key data level is 7 (="0111"), or in periods T1 and T5 in FIG. 2(B), the attenuation rate of the background video image becomes zero and the background video image is displayed at its own level.

By collectively representing key data and caption data as 4-bit data in this way (each level is substantially 3-bit data since the MSB represent the type), this 4-bit data can be placed as substantially the same data in a bit stream to simplify the circuit construction. In addition, assignment of the levels of both can be changed appropriately.

Figure 4:
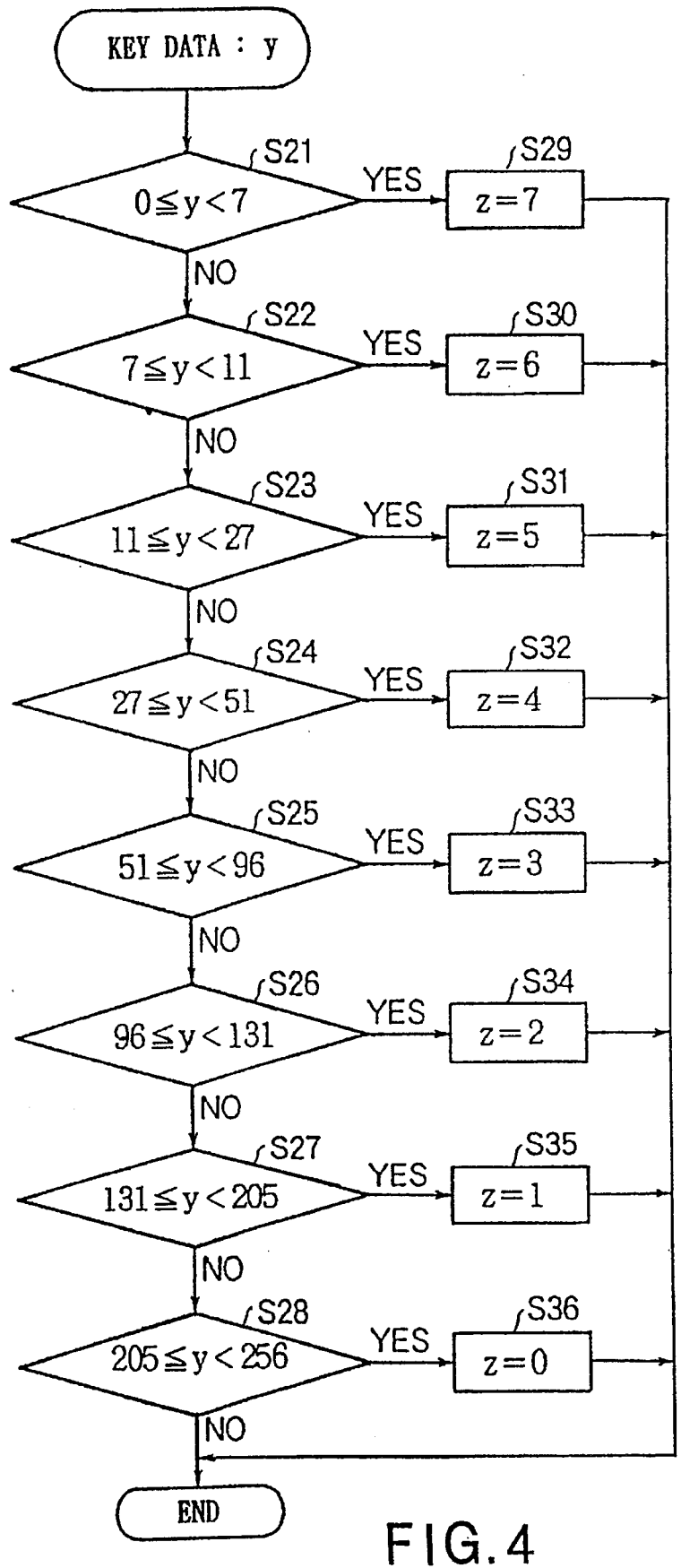
FIG. 4 is a flowchart for explaining the operation of quantizing key data in the quantizer circuit 14 in FIG. 1.
Figure 5:
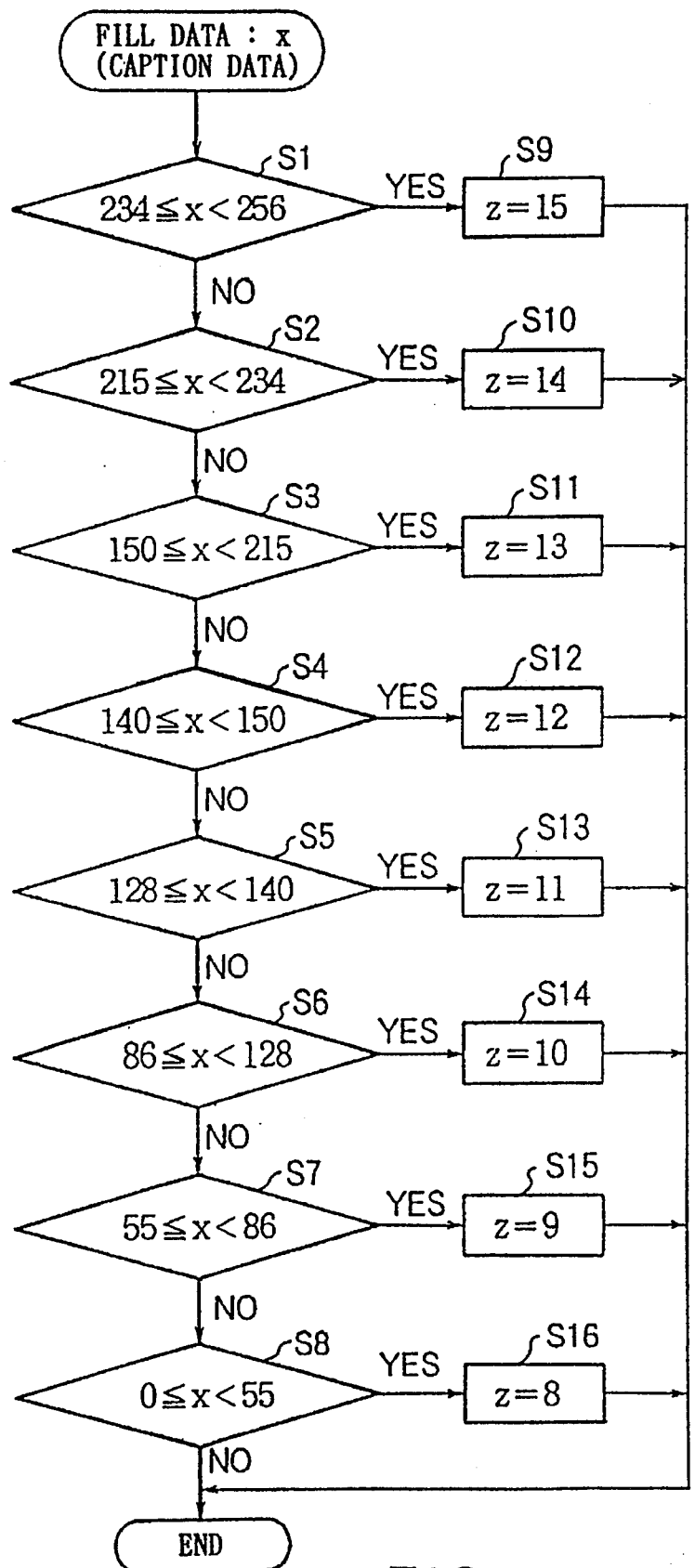
FIG. 5 is a flowchart for explaining the operation of quantizing caption data in the quantizer circuit 14 in FIG. 1.

FIGS. 4 and 5 show the principles of quantizing the levels of key data and caption data. For instance, in periods T1, T2, T4, and T5 in FIG. 2, key data is input to the quantizer circuit 14. As shown in FIG. 4, if a key data level is represented by eight bits and there are 256 levels from 0 to 255, the quantizer circuit 14 divides the 256 levels into eight ranges, and determines which range the value of input key data "y" belongs to, in steps S21 to S28. That is, the eight ranges are ranges 0 to 6, 7 to 10, 11 to 26, 27 to 50, 51 to 95, 96 to 130, 131 to 204, and 205 to 255. When it is determined that "y" belongs to any of them in steps S21 to S28, the process proceeds to steps S29 to S36, respectively, one of the values 7 (="0111") to 0 (="0000") is output as 4-bit quantized output "z".

Similarly, for instance, in period T3 of FIG. 2, caption data is input to the quantizer circuit 14. If caption data is represented by eight bits and has 256 levels, 0 to 255, it is determined to which range of 255 to 234, 233 to 215, 214 to 150, 149 to 140, 139 to 128, 127 to 86, 85 to 55, and 54 to 0 a caption data (fill data) "x" belongs, in steps S1 to S8 of FIG. 5. If it is determined that "x" belongs to any range, it proceeds to steps S9 to S16, respectively, and one of the values 15 (="1111") to 8 (="1000") is set as 4-bit quantized data "z". Incidentally, it is also possible that 4-bit caption and key data are generated from the character generator 5 and directly input to a DPCM circuit 15, without bypassing the quantizer circuit 14.

Blanking data is also supplied to the quantizer circuit 14 from the character generator 5 via contact a of the switch 12. Various data can be inserted into the blanking data as needed.

In addition, the caption data output from the processing circuit 13 is supplied to the quantizer circuit 14 via contact "c" of the switch 12. The processing circuit 13 is adapted to process the analog caption signal output by the flying spot scanner 6, and output it as digital caption data.

Figure 6:
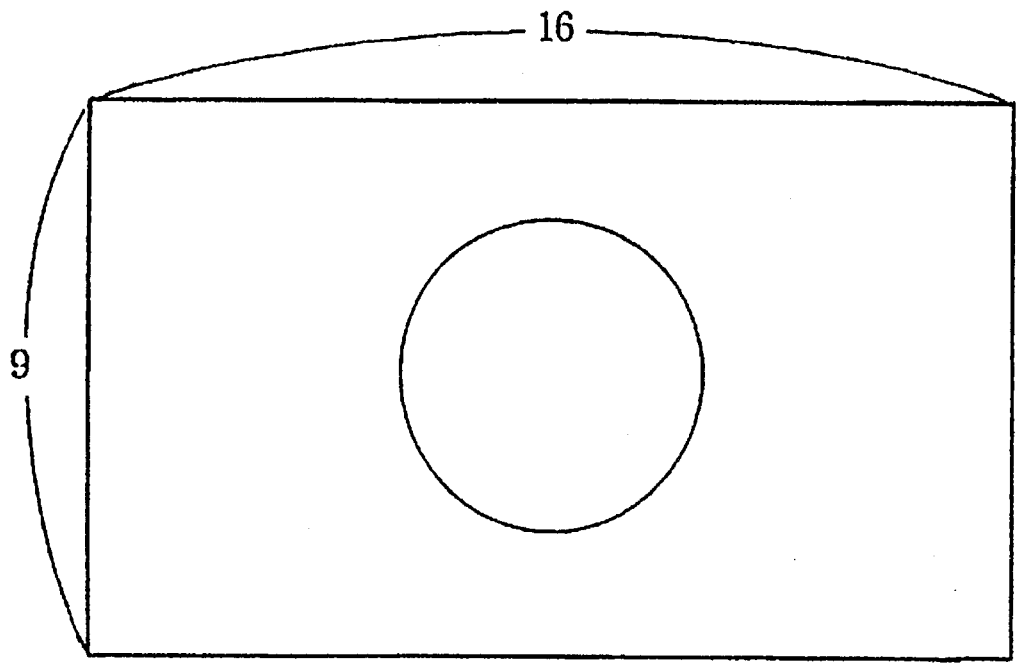
FIG. 6 is a figure for explaining the screen of an aspect ratio having a longer lateral length.

On the one hand, if the video signal supplied to the video coder 2 is that obtained by conversion of a movie to a video signal, its aspect ratio has a longer lateral length as shown in FIG. 6, for instance. Some of the current television receivers have a screen having an aspect ratio of 16 to 9 as represented by so-called high-definition television and, in a television receiver with such an aspect ratio, an image having the aspect ratio of a movie can be directly displayed on the screen of the television receiver.

Figure 7:
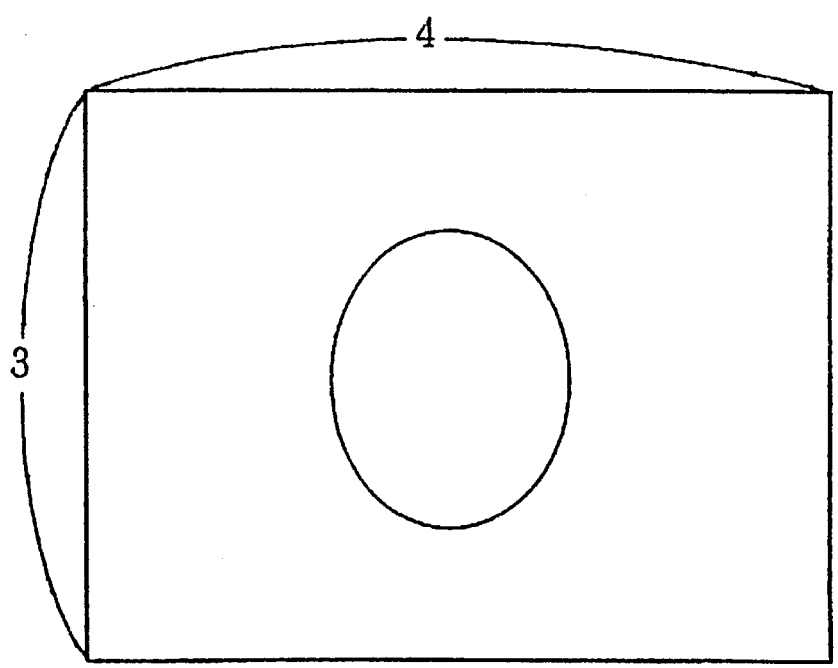
FIG. 7 is a figure for explaining the screen of the squeeze method.

On the other hand, the aspect ratio of the conventional NTSC system is 4 to 3 as shown in FIG. 7. To watch the image of the aspect ratio having a longer lateral length on the screen of the aspect ratio of the usual NTSC system, that aspect ratio may be converted to 4 to 3 but, in that case, the image becomes an oblong image as shown in FIG. 7.

However, in a television receiver having an aspect ratio having a longer lateral length, an image having a normal ratio can be watched as shown in FIG. 6 if the video signal converted to the aspect ratio of 4 to 3 is restored to the original aspect ratio. A television receiver having an aspect ratio having a longer lateral length often includes a converter circuit for restoring the video signal converted to the aspect ratio of 4 to 3 in the squeeze method to the original aspect ratio, as described above. Thus, when an image of the aspect ratio having a longer lateral length as shown in FIG. 6 is input, the video coder 2 converts it to an image of the aspect ratio of 4 to 3 by the squeeze method before coding as shown in FIG. 7.

When the aspect ratio of an image is converted by the squeeze method in this way, it is also required to convert the aspect ratio of a caption having a longer lateral length by the squeeze method. The processing circuit 13 has such function.

Figure 8:
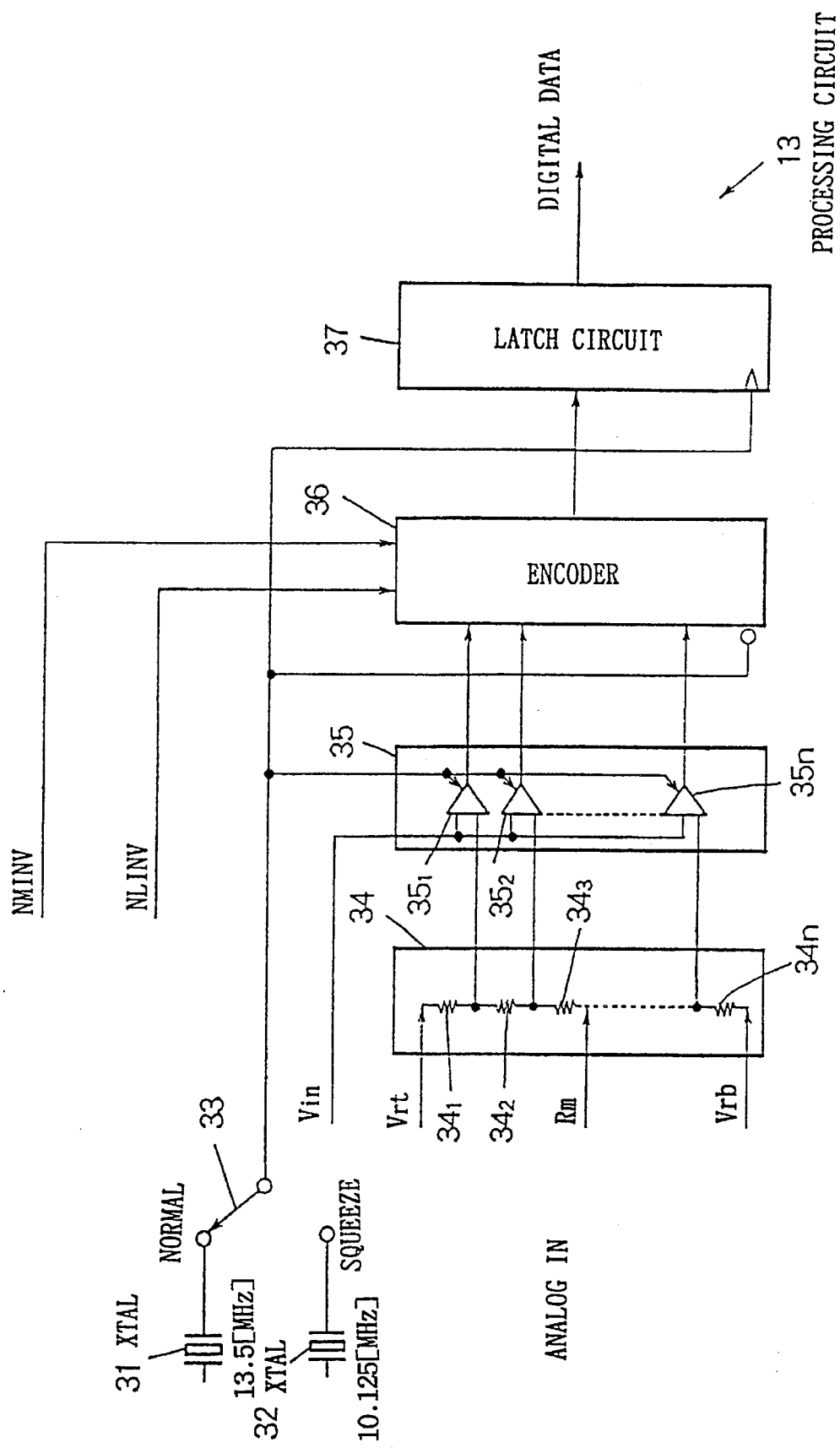
FIG. 8 is a block diagram showing a structural example of the processing circuit 13 in FIG. 1.
Figure 10A:
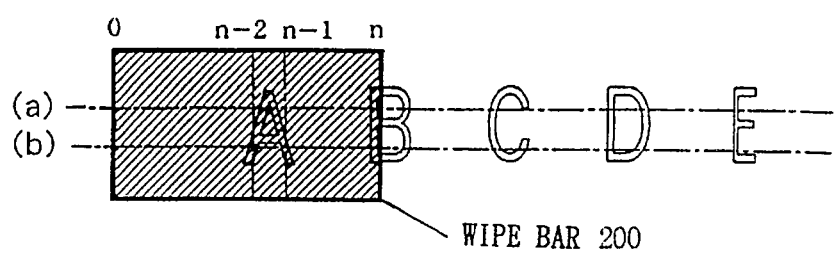
Figure 10A:
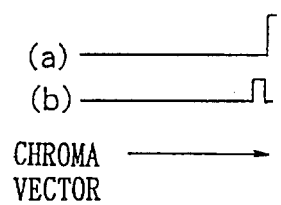
Figure 10A:
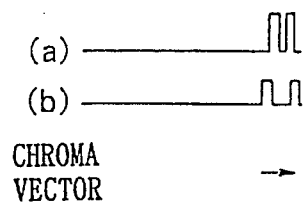
Figure 10A:
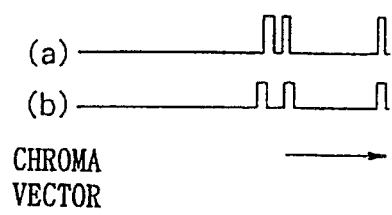

FIG. 8 shows a structural example of the processing circuit 13. The flying spot scanner 6 supplies an analog caption signal corresponding to the video image to be input to the video coder 2 to the comparator circuit 35 of the processing circuit 13 as Vin. Also supplied to the comparator circuit 35 are the reference voltages output by a voltage divider circuit 34 having n resistors $34_1$ to $34n$.

The comparator circuit 35 has n comparator means $35_1$ to $35n$ to which the respective reference voltages output by the voltage divider circuit 34 are supplied, respectively, and compares the caption signal supplied from the flying spot scanner 6 with the respective reference values. The comparator means $35_1$ to $35n$ output, for instance, a signal of logical "1" when the caption signal is larger than the reference value, and output a signal of logical "0" when the reference value is larger than the caption signal.

An encoder 36 monitors the output of the comparator means $35_1$ to $35n$, and encodes the n levels to a m-bit signal, where n=2 m. Input signals NMINV and NLINV determine which of the maximum or minimum value output from the comparator circuit 35 the value of zero after quantized is made to correspond to. A latch circuit 37 latches the m-bit data output by the encoder 36 and outputs it to the quantizer circuit 14 via contact "c" of the switch 10.

The clock output by an oscillator circuit 31 or 32 is supplied to the comparator circuit 35, encoder 36, and latch circuit 37 via a switch 33. The frequency of the clock output by the oscillator circuit 31 is 13.5 MHz, and the frequency of the clock output by the oscillator circuit 32 is 10.125 MHz. That is, the ratio of the two is 4 to 3.

On the one hand, if the video signal processed in the video coder 2 is a video signal of the NTSC system having the usual aspect ratio of 4 to 3, the switch 33 is switched to the upper side in the figure to allow the clock output by the oscillator circuit 31 to be output. On the other hand, if the video coder 2 codes a video signal by the squeeze method, the switch 33 is switched to the lower side in the figure. This allows the clock output by the oscillator circuit 32 to be output. Since the frequency of the clock in this case is 10.125 MHz which is ¾ of 13.5 MHz, the usual frequency, the caption signal input to the comparator circuit 35 is also processed by the squeeze method. Incidentally, the processing circuit 13 can be implemented using 4-bit analog-to-digital converter TDC1021 manufactured by TRW Corp. In this case, the output of the processing circuit 13 is 4-bit data, and it may thus be directly input to the DPCM circuit 15 without through the quantizer circuit 14.

Since the caption data and key data fed from the character generator 5 are digital data, they are converted from ordinary data to squeeze data by a digital filter circuit 24, and sent to the quantizer circuit 14 via contact b of the switch 12.

The caption data quantized by the quantizer circuit 14 is input to the DPCM circuit 15 and processed. Then, the output of the DPCM circuit 15 is supplied to a run length coding circuit 16. The run length coding circuit 16 codes the input DPCM caption data to level and run pairs. A variable-length coding circuit 17 executes the variable-length coding process according to a table as shown in FIG. 9 for the run supplied from the run length coding circuit 16. A packing circuit 18 combines the variable-length coded data with levels.

For instance, if the output of the quantizer circuit 14 is now 1, 4, 7, 12, 15 . . . , the output of the DPCM circuit 15 is 1, 3, 3, 5, 3, the pair of outputs (level, run) of the run length coding circuit 16 is data such as (1, 1), (3, 2), (5, 1), (3, 1) . . . , and the bit train after the variable-length coding of the run by the variable-length coding circuit 17 becomes "000100011111000101000110 . . . ".

The first 4-bit data "0001" indicates that the first data (level) is 1. The next 1-bit data "0" indicates that the run is 1. The next data "0011" indicates that the data (level) is 3. Still the next data "1100" indicates that the run is 2. The coding is similarly performed for subsequent data.

If the number of run lengths is greater than a predetermined number (in this embodiment, 57), the data amount can be made less if the VLC code is made to be a fixed length. In this embodiment, the VLC code is made to be a fixed length of 12 bits if the run lengths are more than 57. In addition, a VLC code "1111111" representing the end is placed on the end of one line.

The data (run) which has thus been variable-length coded by the variable-length coding circuit 17 is packed with the level value extracted by the run length coding circuit 16 in the packing circuit 18, as described above, and is output to the multiplexer 8.

In addition, the packing circuit 18 now multiplexes a time code, positional information, and EPO with Y code data, which is caption data. The time code is the same as the time code of the video frame of a timing at which a caption is to be displayed. Positional information represents the position at with the caption is to be displayed within the video frame (block position) (this point is described later with reference to FIG. 22). EOP is data representing the end of the caption of one page. In addition, the packing circuit 18 adds a 16-bit cyclic redundancy check (CRC) code so that error detection can be performed at the decoding side.

Further, the packing circuit 18 calculates the amount of generated caption data at predetermined time intervals, and supplies the calculation result to the rate controller 2a of the video coder 2. The rate controller 2a determines the bit amount for the first pass of video coding in the first pass process and, thus, when it further determines the caption data amount from the signal from the packing circuit 18, it sets the bit rate in the video coder 2 in the second pass video coding so as to provide a variable rate which takes advantage of the capacity of the transmission channel 29 or the disk 28 at maximum. For the variable rate video coder in which the bit rate is set using two passes, its details are omitted here because it is described in International Patent Application No. PCT/JP94/00610 previously filed by the present applicant.

In addition, data in character broadcasting, teletext, and other services utilizing the blanking region (retrace line interval) is similarly supplied to the caption coding system 7, where it is subjected to a process similar to the above described one so as to be coded independently of the video data within the effective scan period, and transmitted.

Moreover, if a wipe bar is desired to be displayed, in the packing circuit 18, the chroma vector, brightness data (Y) offset level, and chroma data (C) offset level which are generated by a vector generator circuit, are also packed in association with caption data. The brightness data offset level represents an offset value for Y-code data. The chroma data offset level represents an offset value for the default value for chroma. The chroma vector is described with reference to FIG. 10.

It is now assumed that characters A to E are displayed on a screen as a caption, as shown in FIG. 10. For instance, if the caption is the words of a "karaoke" (sing-along) system, the position of the words (characters) to be sung gradually changes with the lapse of time along with the progression of the music. The words (character) to be sung are sometimes represented by a wipe bar 200 of a predetermined color to allow the user to easily recognize the position of the words to be sung. In such case, captions (characters) A to E are displayed during that page. That is, captions (A to E) are displayed until the words (A to E) are completely sung from beginning to end. Accordingly, this page generally consists of a video image of a plurality of fields or frames.

In FIG. 10, 0, n-2, n-1, and n represent frames which change with time. In this embodiment, in the (n-2)-th frame, the end of the wipe bar 200 is located at substantially the middle position of the left half of character A, and in the (n-1)-th frame, the end of the wipe bar 200 reaches a position about three quarters across the right half of character A. Further, in the n-th frame, the end of the wipe bar 200 reaches a position of about one quarter across character B.

Now, when the level changes of the chroma signals in lines represented by (a) and (b) in FIG. 10 at the respective frames n-2, n-1 and n, they are as shown by $TR_{n-2}$, $TR_{n-1}$, and $TR_n$. That is, the chroma level changes between the inside region and the outside region of the wipe bar 200. Since the wipe bar 200 moves to the right in the figure during the period from frame 0 to frame n-2, the chroma vector representing the movement of the wipe bar 200 during that period is as shown by $TR_{n-2}$. Similarly, the chroma vector during the period from frame n-2 to n-1 and the chroma vector corresponding to the movement of the wipe bar 200 from frame n-1 to n are as shown by $TR_{n-1}$ and $TR_n$.

To generate such chroma vectors, the character generator 5 in FIG. 1 outputs the data of the wipe bar as caption data in addition to character data. The output of the quantizer circuit 14 corresponding to the wipe bar data is supplied to a threshold circuit 21, the output of the threshold circuit 21 is supplied to an end detection circuit 22, the output of the end detection circuit 22 is supplied to the vector generator circuit 23, and the chroma vector generated by the vector generator circuit 23 is supplied to the packing circuit 18.

Figure 11:
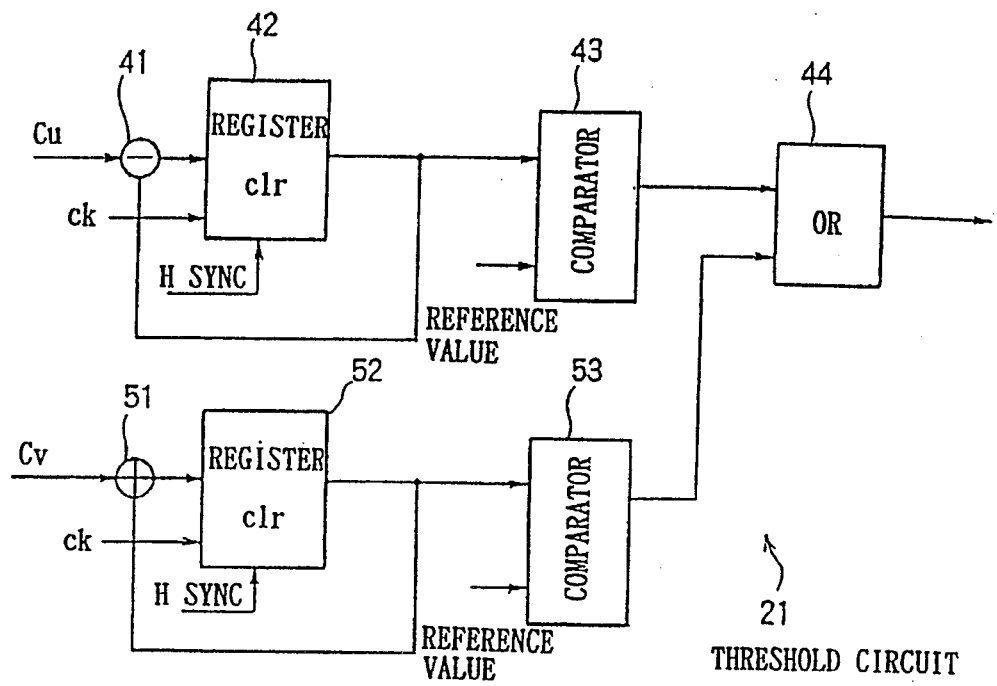
FIG. 11 is a block diagram showing a structural example of the threshold circuit 21 in FIG. 21.

The threshold circuit 21 is constructed, for instance, as shown in FIG. 11. Color difference data Cu corresponding to the wipe bar 200 output by the quantizer circuit 14 is provided to a subtracter circuit 41. In a register 42, the output of the subtracter circuit 41 at the timing at which the preceding clock was supplied is held. The subtracter circuit 41 subtracts the value held in the register 42 from the currently input value, and newly holds the difference in the register 42.

That is, since such an operation is repeated each time a clock is input, the register 42 holds difference data of the color difference data Cu at the timings at which two clocks are input. On the one hand, if color difference data Cu has no change in the period during which the two clocks were generated, a substantial zero value (or a very small value) is held in the register 42. On the other hand, if there is a change in color difference data Cu, a large value is held in the register 42. The value in the register 42 is cleared for each line.

The value held in the register 42 is supplied to a comparator circuit 43 to be compared with a predetermined reference value which was previously set. The comparator circuit 43 outputs a signal of logical "1" if the value held in the register 42 is larger than the reference value.

A construction similar to that by the subtracter circuit 41, register 42, and comparator circuit 43 is constructed by a subtracter 51, a register 52, and a comparator circuit 53, and by these circuits, a similar process is carried out for other color difference data Cv corresponding to the wipe bar 200. The comparator circuit 53 thus outputs logical "1" when a change larger than the reference value occurs in color difference data Cv.

When a signal of logical "1" is output from the comparator circuit 43 or the comparator circuit 53, an OR circuit 44 outputs that signal to the end detection circuit 22. That is, the OR circuit 44 outputs a signal of logical "1" when the right end of the wipe bar 200 shown in FIG. 10 is detected.

Figure 12:
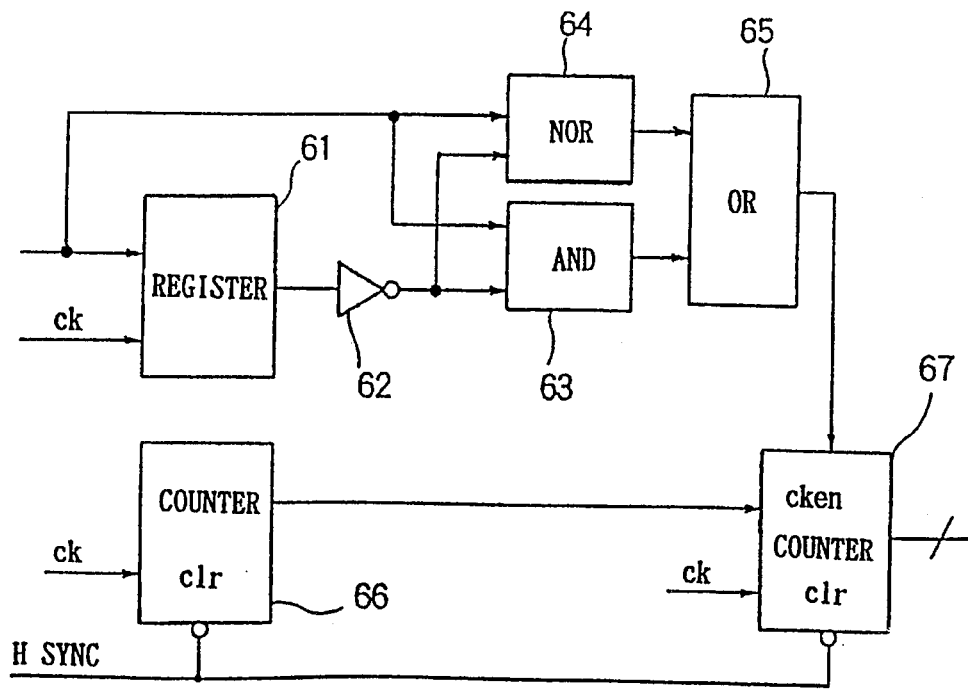
FIG. 12 is a block diagram showing a structural example of the end detector circuit 22 in FIG. 1.

The end detection circuit 22 is constructed, for instance, as shown in FIG. 12. The output of the OR circuit 44 in FIG. 11 is provided to a register 61 in FIG. 12 in which it is held. The data held in the register 61 is inverted by an invertor 62 and supplied to an AND circuit 63 and a NOR circuit 64. To the AND circuit 63 and the NOR circuit 64, the data output from the OR circuit 44 in FIG. 11 is also directly supplied.

That is, the register 61 holds the logic which the OR circuit 44 generated at the preceding clock generation timing, and the AND circuit 63 and the NOR circuit 64 perform the operation of the preceding logic with the logic currently output by the OR circuit 44. The AND circuit 63 outputs logical "1" when the logic held in the register 61 is "0" (the output of the invertor 62 is logical "1") and the logic output from the OR circuit 44 is "1," that is, when the logic is inverted from "0" to "1."

Further, the NOR circuit 64 outputs logical "1" when the logic held by the register 61 is "1" (the output of the invertor 62 is logical "0" ) and the logic output from the OR circuit 44 is "0," that is, when the logic is inverted from "1" to "0".

An OR circuit 65 enables a register 67 when logical "1" is input from the AND circuit 63 or the NOR circuit 64 (when the right end of the wipe bar 200 is detected).

A counter 66 counts clocks, and its count value is cleared with the timing of the horizontal synchronization signal. That is, the counter 66 outputs a count value corresponding to the position of a horizontal pixel to a register 67. In consequence, the register 67 holds the value of the counter 66 at the timing when the clock is supplied after the signal of logical "1" is input from the OR circuit 65. Since the OR circuit 65 outputs logical "1" at the right end of the wipe bar 200 in FIG. 10, as described above, the register 67 stores the position of the pixel corresponding to that position. The value stored by the register 67 is supplied to the vector generator circuit 23 in the subsequent stage.

Figure 13:
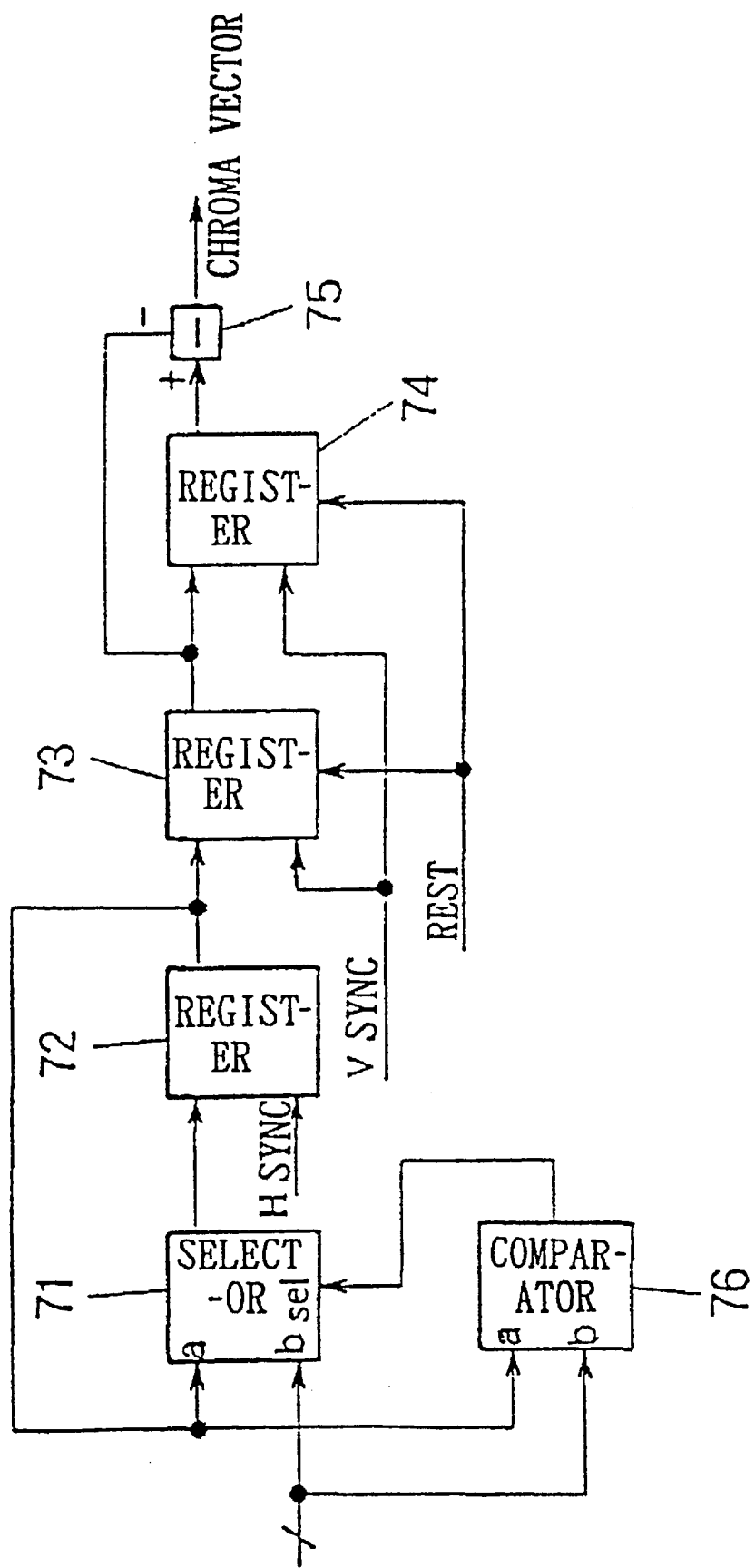
FIG. 13 is a block diagram showing a structural example of the vector generator circuit 23 in FIG. 1.

The vector generator circuit 23 is constructed, for instance, as shown in FIG. 13. The data output from the register 67 in FIG. 12 is provided to a comparator circuit 76 to be compared with the value stored in a register 72. In the register 72, the largest value among the data which has been supplied through a selector 71 is held. The comparator circuit 76 compares the data stored in the register 72 with the data currently supplied by the register 67, and causes the selector 71 to select the larger one.

That is, on the one hand, if the data already held in the register 72 is larger, the selector 71 selects again the data stored in the register 72 and provides it to the register 72. In this way, in the register 72, the value previously held is held as is. On the other hand, if the data supplied from the register 67 is larger than the data held in the register 72, the selector 71 selects the data supplied by the register 67 and supplies it to the register 72. This allows a larger value to be stored in the register 72. Thus, the register 72 holds the largest value among the values which are input during the period of one line.

The value held in the register 72 is transferred to a register 73 in the subsequent stage in synchronization with the vertical synchronization signal. The data held in the register 73 is further transferred to a subsequent register 74 in synchronization with the vertical synchronization signal and stored therein. That is, in the register 74, the largest value among the data representing the right edge of the wipe bar 200 in the preceding field (frame if one vertical synchronization signal per frame) is held, and in the register 73, the largest value among the values in the field before the preceding field is held. A subtracter circuit 75 subtracts the value held in the register 73 from the value held in the register 74. That is, the output of the subtracter circuit 75 is generated in response to the difference between the horizontal position of the wipe bar 200 in the preceding field and that in the succeeding field, as described with reference to FIG. 10, and it is a chroma vector. The chroma vector is supplied to the packing circuit 18 and multiplexed with other data, as described above. In addition, on the decoding side, to cause the wipe bar 200 to have a specified color, the chroma vector is used to change not only chroma data but also brightness data.

Figure 14:
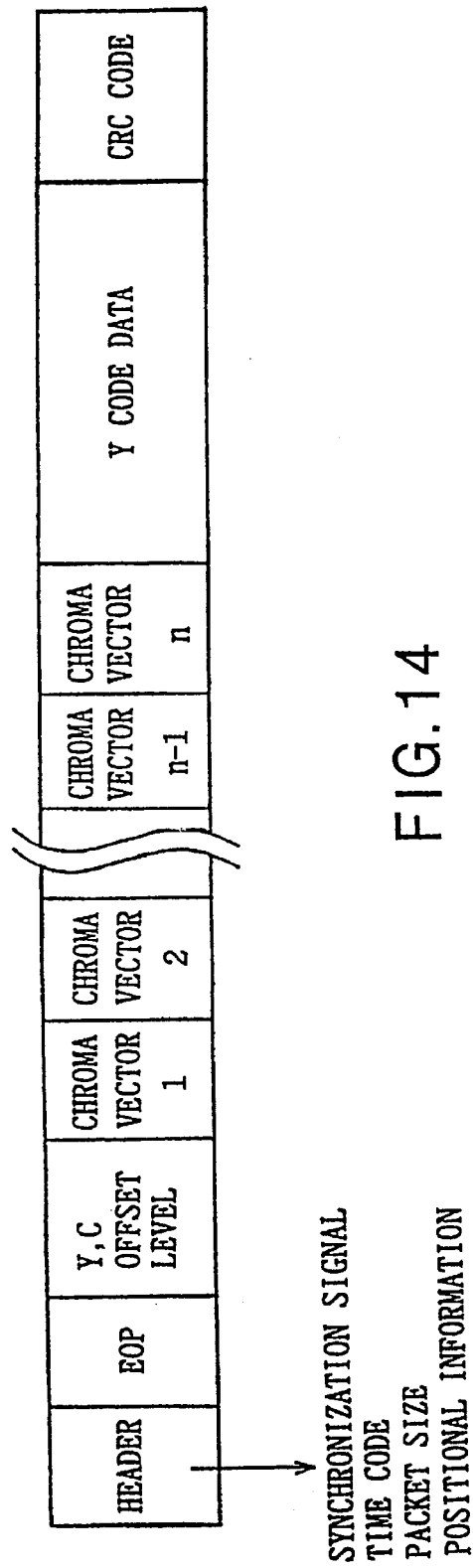
FIG. 14 is a figure for explaining the output format of the packing circuit 18 in FIG. 1.

FIG. 14 represents the format of the data output from the packing circuit 18 when the wipe bar is coded. As shown in the same figure, a header is placed at the beginning of the data, and a synchronization signal, a time code, positional information, and a packet size are registered in the header. The header is followed by an EOP, which is in turn followed by a brightness signal (Y) offset level, and a chroma (C) signal offset level are.

Chroma vectors are placed next to these offset levels in a predetermined number (n). The value of n corresponds to the number of fields for one page. Following the chroma vector is coded brightness data. Further thereafter there follows a CRC code for error detection.

Figure 15:
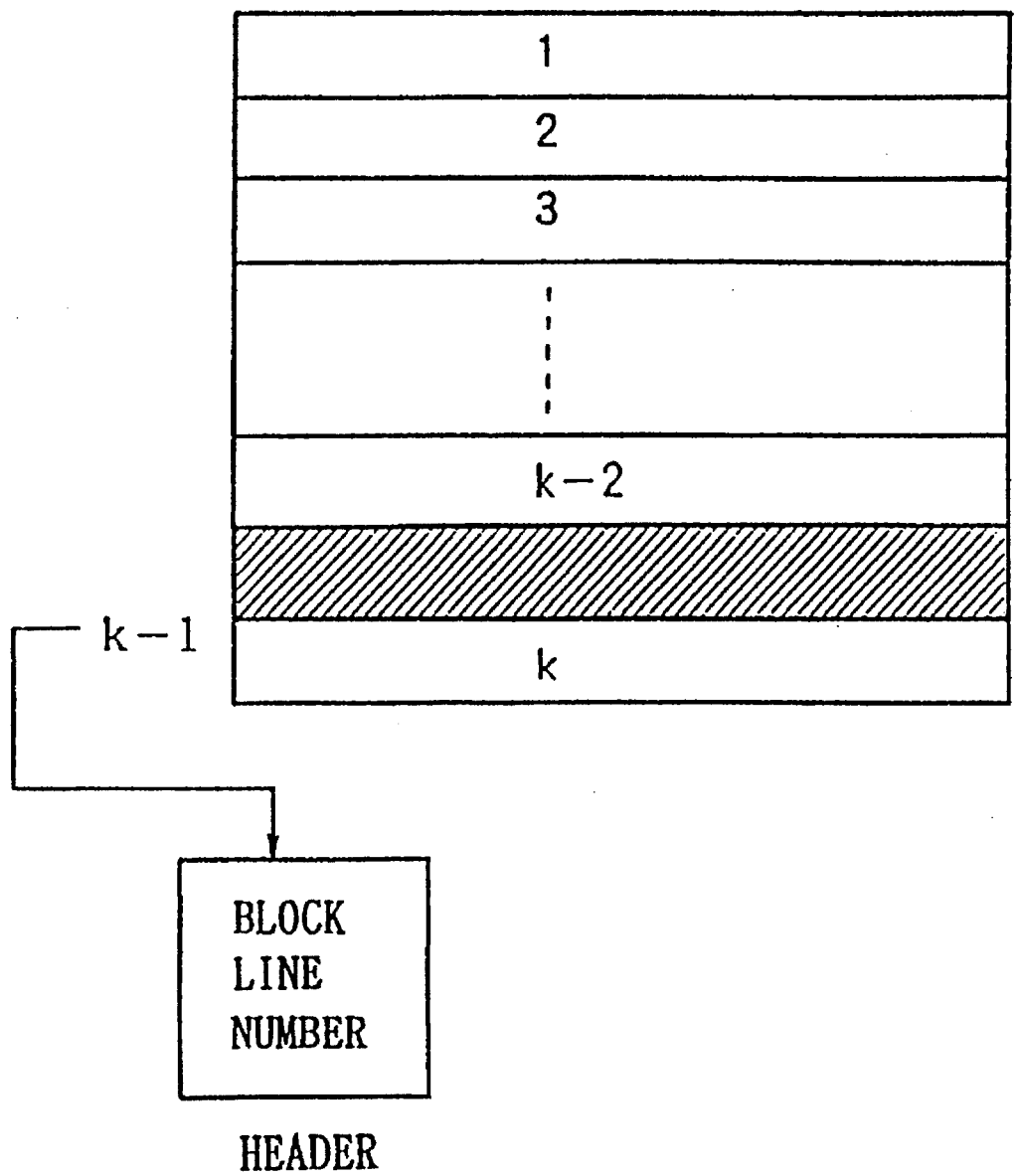
FIG. 15 is a figure for explaining positional information supplied to the packing circuit 18 in FIG. 1.

FIG. 15 shows at which position in a video image for one frame, a caption is to be inserted. In this embodiment, positional information is specified so that the video image for one frame is horizontally divided into "k" blocks and a caption is inserted into the k-1-th block line. To display the caption at this position, the k-1 data (block line numbers) are recorded as part of the header shown in FIG. 14.

Figure 16:
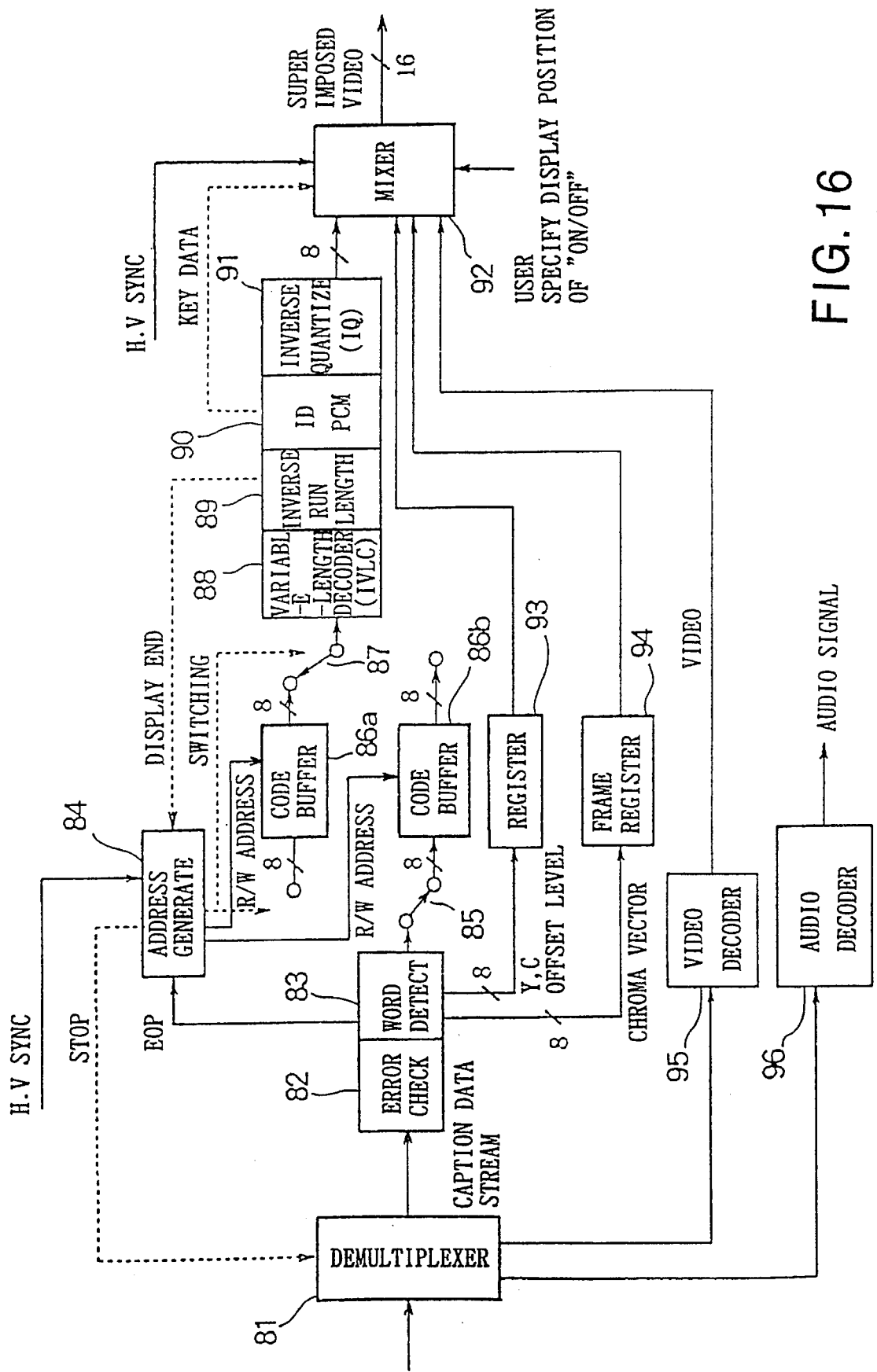
FIG. 16 is a block diagram showing the construction of an embodiment of the caption data decoding system to which the caption data decoding method of the present invention is applied.

FIG. 16 is a block diagram showing the construction of an embodiment of the decoding system for decoding caption data coded as described above. On the one hand, a demultiplexer 81 receives the input of data reproduced from the disk 28 or data transmitted from the transmission channel 29, and divides it into caption data, video data, and audio data. The video data is supplied to a video decoder 95, and supplied to a mixer 92 after decoded. The audio data is supplied to an audio decoder 96, and provided to a circuit (not shown) after being decoded.

On the other hand, the caption data is supplied to an error check circuit 82 for detection of the existence of errors.

Figure 17:
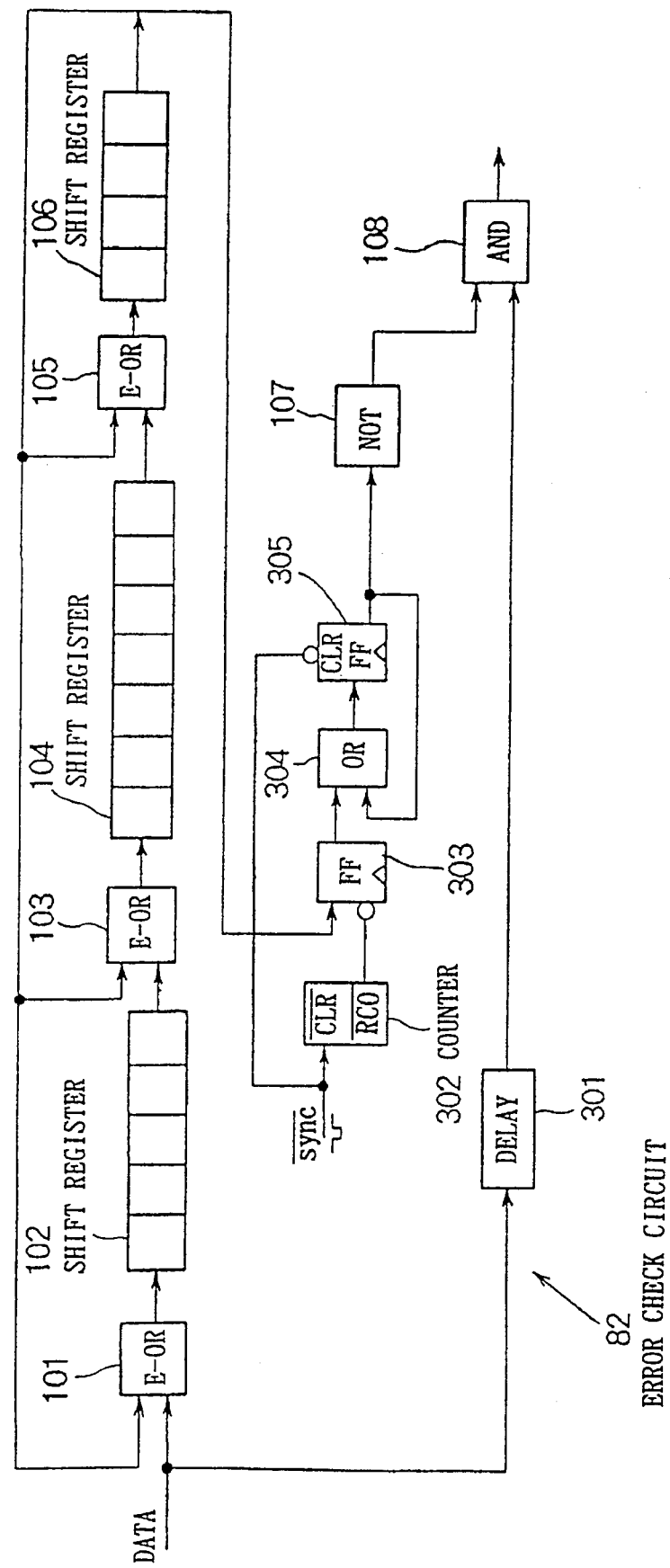
FIG. 17 is a block diagram showing a structural example of the error check circuit 82 in FIG. 16.

The error check circuit 82 is constructed, for instance, as shown in FIG. 17 if a 16-bit CRC is used. In this embodiment, the data supplied by the demultiplexer 81 is supplied to one input of an exclusive OR circuit 101. The output of a shift register 106, which delays the input by four clocks and outputs it, is supplied to the other input of the exclusive OR circuit 101. The exclusive OR circuit 101 performs an exclusive OR operation on both inputs. The output is provided to a shift register 102 and, after being delayed by five clocks, is supplied to one input of an exclusive OR circuit 103.

The output of the shift register 106 is provided to the other input of the exclusive OR circuit 103, and the exclusive OR circuit 103 performs an exclusive OR operation on both inputs and outputs it to a shift register 104. The shift register 104 delays the data output by the exclusive OR circuit 103 by seven clocks, and then supplies it to an exclusive OR circuit 105. The exclusive OR circuit 105 performs an exclusive OR operation on the data supplied from the shift register 104 with the data supplied from the shift register 106, and feeds the operation result to the shift register 106.

A counter 302, initialized by a negative sync (in the figure, a symbol represented by adding an overbar (a horizontal line above the word sync)) obtained from a synchronization signal representing the beginning of a packet, is to perform an error check of the output of the shift register 106 at fixed intervals, and supplies a negative RCO output signal (in the figure, a symbol represented by adding an overbar above the letters RCO) to the clock enable terminal of a flip-flop 303, thereby checking the output of the shift register 106. Once the latched signal goes high (namely, attains an "H" level) from low (namely, an "L" level), it is made to be continuously high by an OR circuit 304 and a flip-flop 305, and the logic is inverted by a NOT circuit 107, so that logical "0" is input to an AND circuit 108. As a result, when an error is detected, the AND circuit 108 becomes nonconducting whereby the caption data supplied from the demultiplexer 81 is prohibited from being supplied to a word detection circuit 83 in the later stage via the AND circuit 108 after passing through a delay circuit 301 with a required number of stages. That is, if caption data has an error, the caption corresponding to the data on the erroneous page is prevented from being displayed.

A word detection circuit 83 in FIG. 16 separates the EOP, brightness data offset level, or chroma data offset level, and chroma vector from the data supplied from the error check circuit 82, and provides them to an address generator 84, a register 93, or a frame register 94. In addition, caption data is supplied to code buffers 86a and 86b via a switch 85. The code buffers 86a and 86b have a capacity for at least one page of caption data each.

Figure 18:
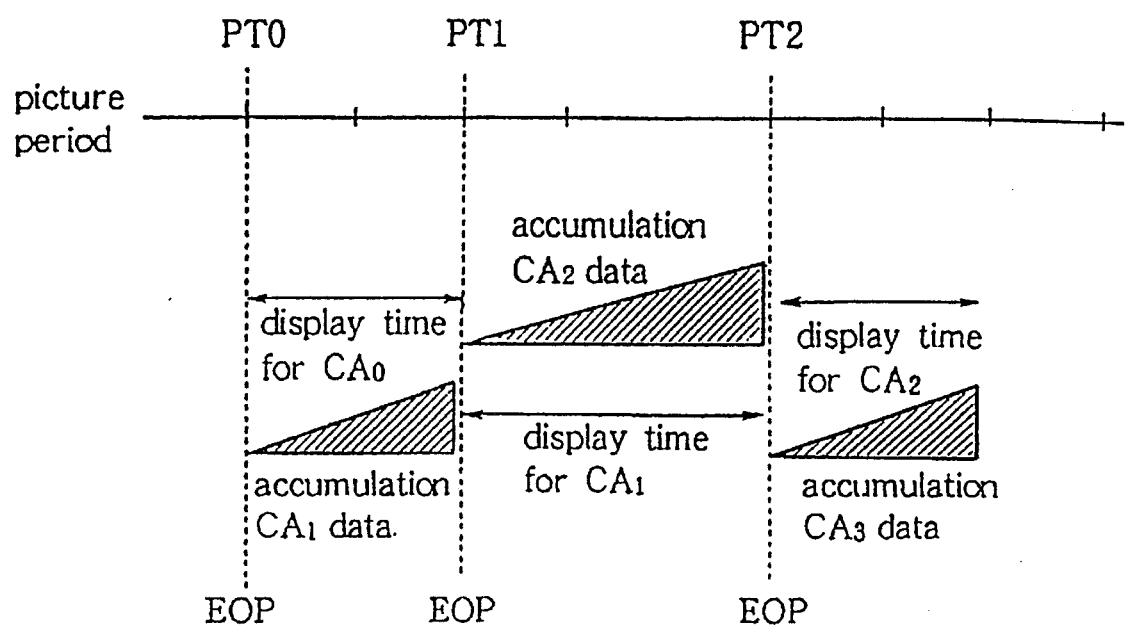
FIG. 18 is a timing chart for explaining the operations of the code buffers 86a and 86b in FIG. 16.

The address generator 84 generates the switching signals for the switches 85 and 87, and generates the write or read addresses of the code buffers 86a and 86b. As shown in FIG. 18, data is read from the code buffer 86b while data is written to the code buffer 86a, and conversely, data is read from the code buffer 86a while data is written to the code buffer 86b. Code buffer switching is performed using EOP indicating the end of a page. This enables the data supplied from the word detection circuit 83 to be continuously processed. By ensuring a capacity for one page in each of the code buffers 86a and 86b, and switching read/write with the timing of EOP, caption data can be instantaneously switched.

In addition, if the timing is such that the transfer of caption data supplied from the demultiplexer 81 is so fast that, before the reading of data from one of the code buffers 86a and 86b is completed, the next data is supplied, the address generator 84 provides a stop signal to the demultiplexer 81 to stop the supply of new data.

A variable-length decoding (IVLC) circuit 88 performs variable-length decoding of the run data read from the code buffer 86a or 86b via the switch 87 using the VLC table of FIG. 9. Level data and the variable-length decoded run data are supplied to an inverse run length circuit 89.

The inverse run length circuit 89 operates as many as counters as the number of run stages, and stops the reading of the code buffers 86a and 86b for as many times as the number of runs while turning the counters. In addition, the inverse run length circuit 89 supplies as many items of level data as the number of runs to an IDPCM circuit 90.

The IDPCM circuit 90 has a register, and adds the preceding level data stored in the register and a new level data supplied from the inverse run length circuit 89, and if that level data is caption data, the IDPCM circuit 90 provides it to an inverse quantizer circuit 91 in the subsequent stage. Further, if that level data is key data, the key data of three bits other than the MSB representing the identifier for key data and caption data of the 4-bit data is output to a mixer 92 in the subsequent stage.

In the inverse quantizer circuit 91, 4-bit data is converted to 8-it data, then this data is fed to the mixer 92.

Figure 19:
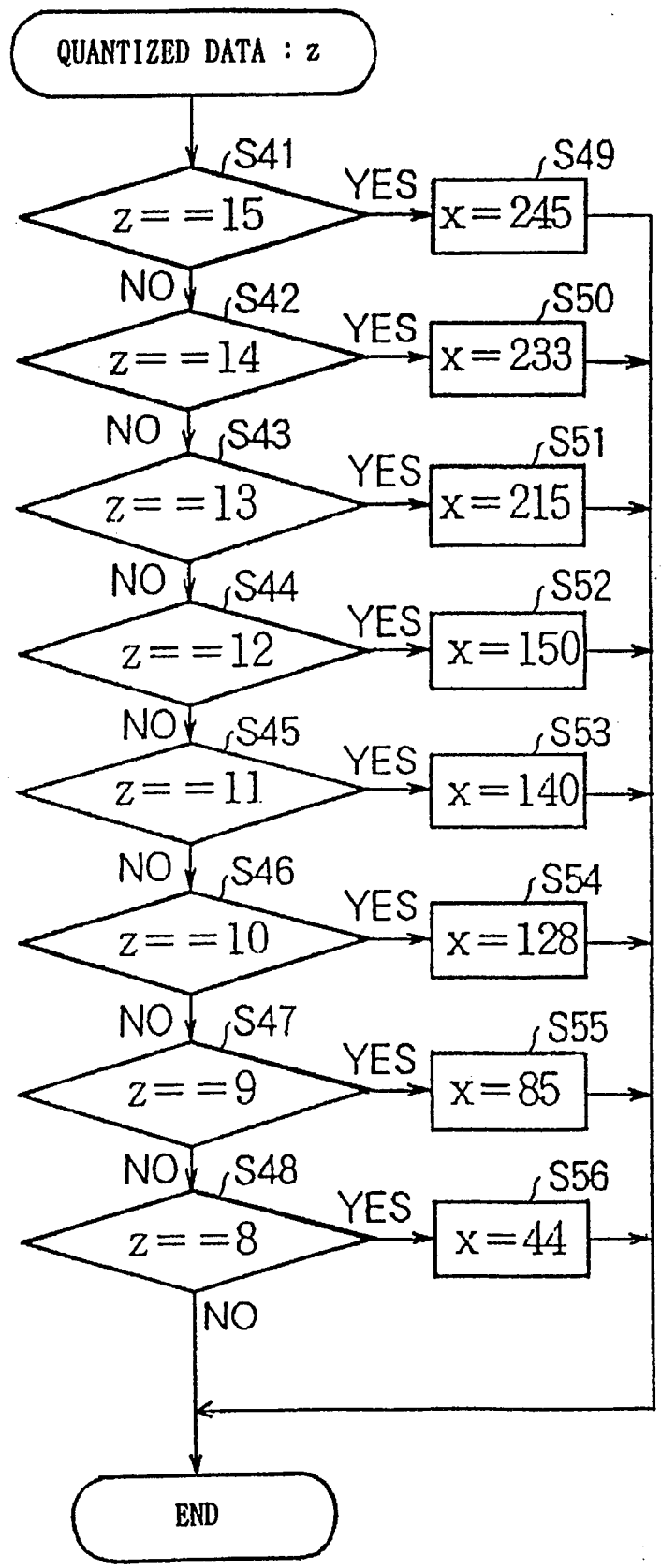
FIG. 19 is a flowchart for explaining the inverse quantization operation in the inverse quantization circuit 91 in FIG. 16.

FIG. 19 represents a processing example for the inverse quantization operation in the inverse quantizer circuit 91. As shown in the same figure, for 4-bit quantized data "Z", it is determined in steps S41 to S48 whether the value is any value from 15 to 8. If quantized data "Z" is any value from 15 to 8, the process proceeds to steps S49 to S56, where a value 245, 233, 215, 150, 140, 128, 85, or 44 is set as caption data (fill data) "x".

Figure 20:
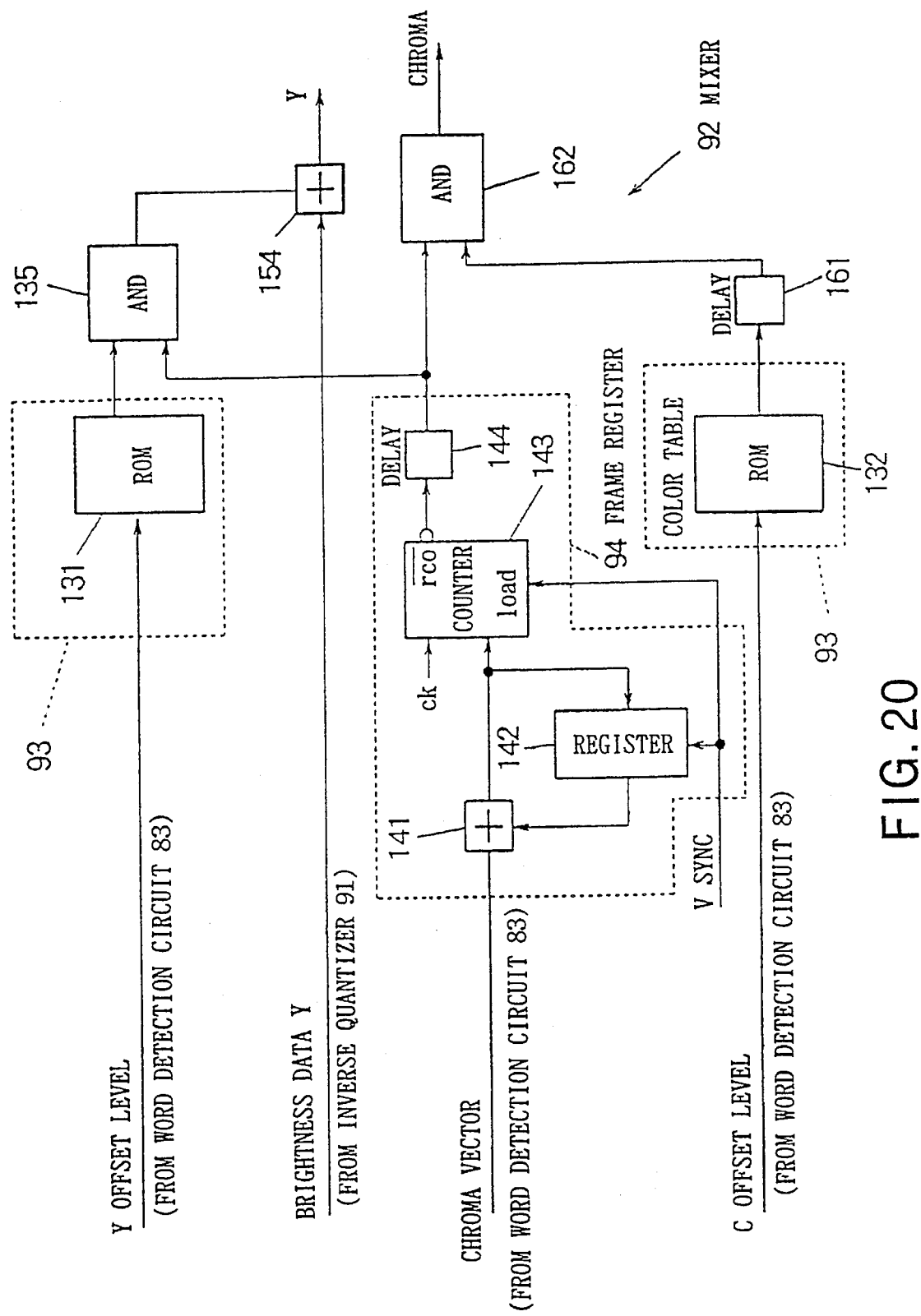
FIG. 20 is a block diagram showing the more detailed constructions of the register 93, frame register 94, and mixer 92 in FIG. 16.
Figure 21:
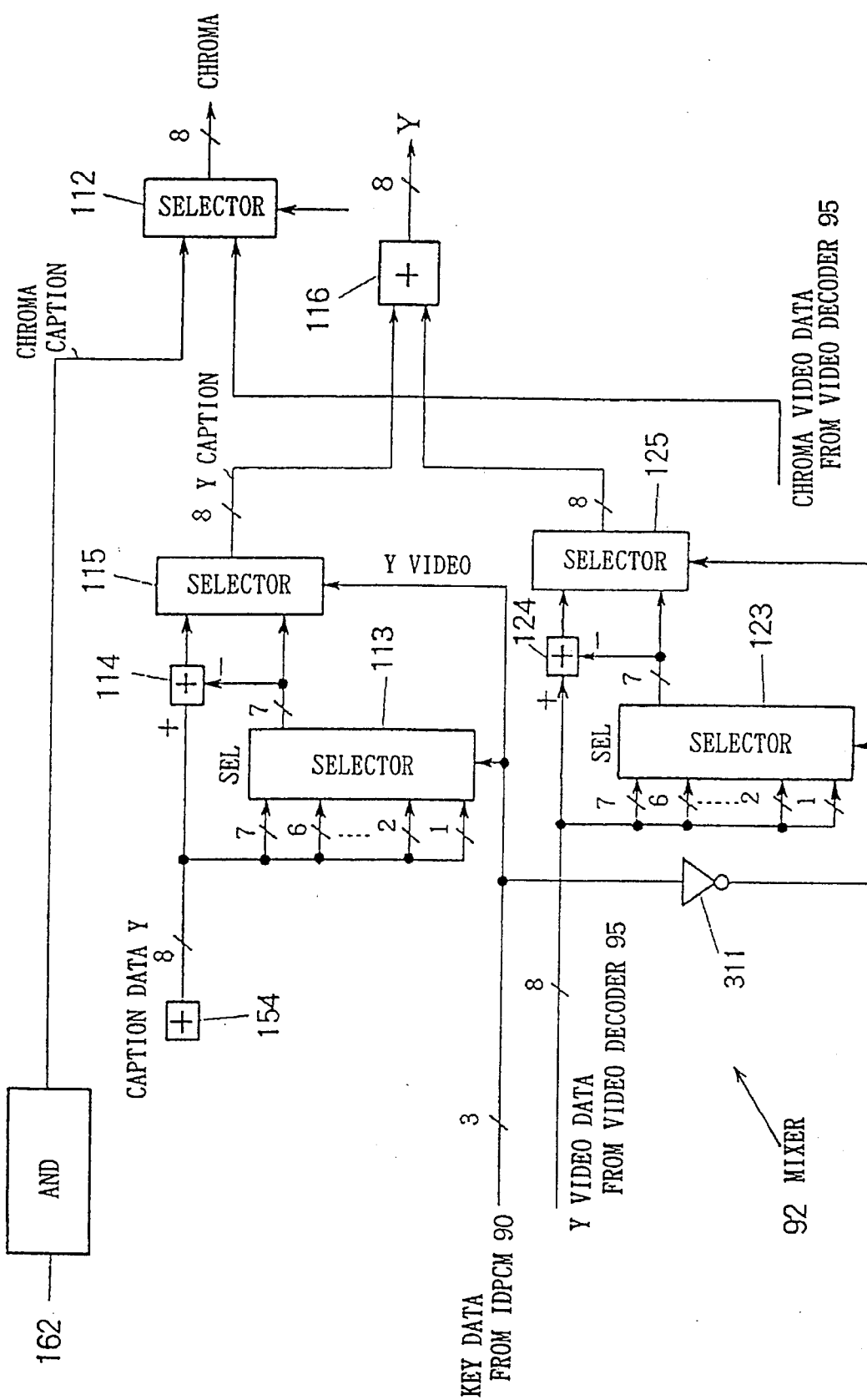
FIG. 21 is a block diagram showing the more detailed construction of the mixer 92 in FIG. 16.

The more detailed constructions of the register 93, frame register 94, and mixer 92 in FIG. 16, are shown in FIGS. 20 and 21.

In the embodiment in FIG. 20, the register 93 is constructed from a ROM 131 and a ROM 132.

Further, the frame register 94 consists of an adder circuit 141, a register 142, a counter 143, and a delay circuit 144. The remaining circuits in FIG. 20 form part of the mixer 92.

The brightness data offset level (a level for providing the wipe bar 200 with a predetermined color) output from the word detection circuit 83 is supplied to the ROM 131, and converted to a predetermined value according to the table stored therein. Then, the data converted by the ROM 131 is supplied via an AND circuit 135 to an adder circuit 154, where it is added to the brightness data (initial data for identifying the character color when the wipe bar 200 is not displayed) of the caption data output from the inverse quantizer circuit 91 in FIG. 16 and supplied to a selector 113 and an adder circuit 114 in FIG. 21. This offset level was set to a predetermined value by the user in the encoder shown in FIG. 1. Thus, by changing this value appropriately, the brightness data of the wipe bar can be set to a predetermined value (color).

Similarly, the chroma offset level output from the word detection circuit 83 is fed to the ROM 132, and converted to a predetermined value according to the table stored therein. Then, the data output from the ROM 132 is supplied to a selector 112 in FIG. 21 via an AND circuit 162, after being delayed by a delay circuit 161 to a predetermined timing.

On the one hand, by converting data using the ROM 131 and the ROM 132, more colors (brightnesses) can be specified by fewer bits for the wipe bar 200. If the number of bits of the brightness data and color difference data of the caption is increased, such ROM 131 and ROM 132 can be omitted. However, this will reduce the transmission efficiency.

On the other hand, the chroma vector separated by the word detection circuit 83 is supplied to the adder circuit 141 of the frame register 94, where it is added to the preceding value held in the register 142. Then, the sum is held in the register 142 for the next calculation. The register 142 is cleared in synchronization with the vertical synchronization signal. That is, in the register 142, the cumulatively added values of chroma vectors during the period of one field are sequentially held. In other words, the value stored in the register 142 represents the position of the wipe bar 200 shown in FIG. 10 in each field.

A counter 143 loads the output of the adder circuit 141 each time the vertical synchronization signal is input. That is, it loads a value corresponding to the horizontal position of the wipe bar 200 in the preceding field. Then, it immediately starts to count the clocks corresponding to the horizontal pixels, and, for instance, decrements the loaded value by one for each time. When the count value reaches a predetermined value (for instance, zero), the counter 143 inverts the output of the ripple carry-over (rco) terminal from logical "1" to logical "0." This signal, after being adjusted in timing by a delay circuit 144, is supplied to AND circuits 135 and 162.

The AND circuits 135 and 162 enable the data output from the ROM 131 or 132 to pass therethrough, during the period in which logical "1" is input, or during the period from the time when the vertical synchronization signal is input to the counter 143 to the time when the count value becomes zero. However, after the output of the delay circuit 144 is inverted to logical "0," it prohibits the passage of these data. That is, the wipe bar 200 shown in FIG. 10 is displayed until the position set by the counter 143, and the wipe bar 200 is not displayed on the right of that.

The brightness data output by the adder circuit 154 in this way is supplied to the selector 113 and the adder circuit 114 in FIG. 21, and the chroma data output from the AND circuit 162 is provided to the selector 112 in FIG. 21.

The selector 113 selects any of 7-bit data obtained by shifting the caption brightness data supplied from the adder circuit 154 by one bit to the LSB side, 6-bit data shifted by two bits, ..., 2-bit data shifted by six bits, and 1-bit data shifted by seven bits. Which data to select is set by the key data supplied from the IDPCM circuit 90 shown in FIG. 16. The subtracter circuit 114 subtracts the data selected by the selector 113 from the brightness data supplied from the adder circuit 154, and provides the result to a selector 115. That is, if the output of the selector 113 is assumed to be $\alpha$, for instance, the subtracter circuit 114 outputs 1-$\alpha$. The selector 115 selects this or 1-$\alpha$ and outputs it to an adder circuit 116.

Similarly, the brightness data of the background image output from the video decoder 95 is fed to a selector 123 and a subtracter circuit 124. The selector 123 selects the data obtained by shifting the input brightness data by a predetermined number of bits to the least significant bit (or LSB) side according to the key data, and outputs it to a selector 125 and a subtracter circuit 124, as does the selector 113. The subtracter circuit 124 subtracts the output of the selector 123 from the input video data, and outputs the result to the selector 125.

As a consequence, as in the above described case, the selector 125 also selects, for instance, either the data 1-$\beta$ supplied from the subtracter circuit 124, or the data $\beta$ supplied from the selector 123, and outputs it to the adder circuit 116.

However, the above description also shows an example of the case in which not only caption data but also key data is transmitted during period T3 in FIG. 2 and, in this embodiment, the selector 113, subtracter circuit 114, and selector 115 are unnecessary, in fact, so that the output of the adder circuit 154 is directly input to the adder circuit 116.

On the one hand, the selector 115 and the selector 125 are switched so as to complimentarily operate each other. That is, the adder circuit 116 adds the brightness data of the caption output by the selector 115 and the brightness data of the background video image output by the selector 125, and outputs the sum but, as described with reference to FIG. 2, the background video image is muted more as the key data value becomes less. To implement this, the key data supplied from the IDPCM 90 is provided to the selectors 113 and 115 as straight 3-bit data, and to the selectors 123 and 125 as data inverted by the inverter 311.

On the other hand, the selector 112 is provided with the chroma data of the caption output by the AND circuit 162 and the chroma data of the background video image output by the video decoder 95. The selector 112 selects and outputs either of the two inputs.

As described above, by shifting the dynamic range of 0% to 100% by 12.5% (⅛) at a time, the caption and the background video image can be mixed.

As shown in FIG. 21, by performing the operation of data through the bit shifting by the selectors 113 and 123, the need for using a multiplier is eliminated and enables the system to be achieved at a lower cost.

In addition, a control signal for turning on or off the display of caption or a control signal for selecting the display position of caption is input to the mixer 92 in FIG. 16. Upon input of the control signal for turning off the display of the caption, the mixer 92 inhibits the display of the caption. This can be implemented, for instance, by connecting a gate circuit to the outputs of the selector 112 and the adder circuit 116 in FIG. 21 and closing the gate circuit. If an instruction is provided to turn on the display of the caption, the gate circuit is opened to enable the outputs of the selector 112 and the adder circuit 116 to be fed to a circuit (not shown).

Figure 22:
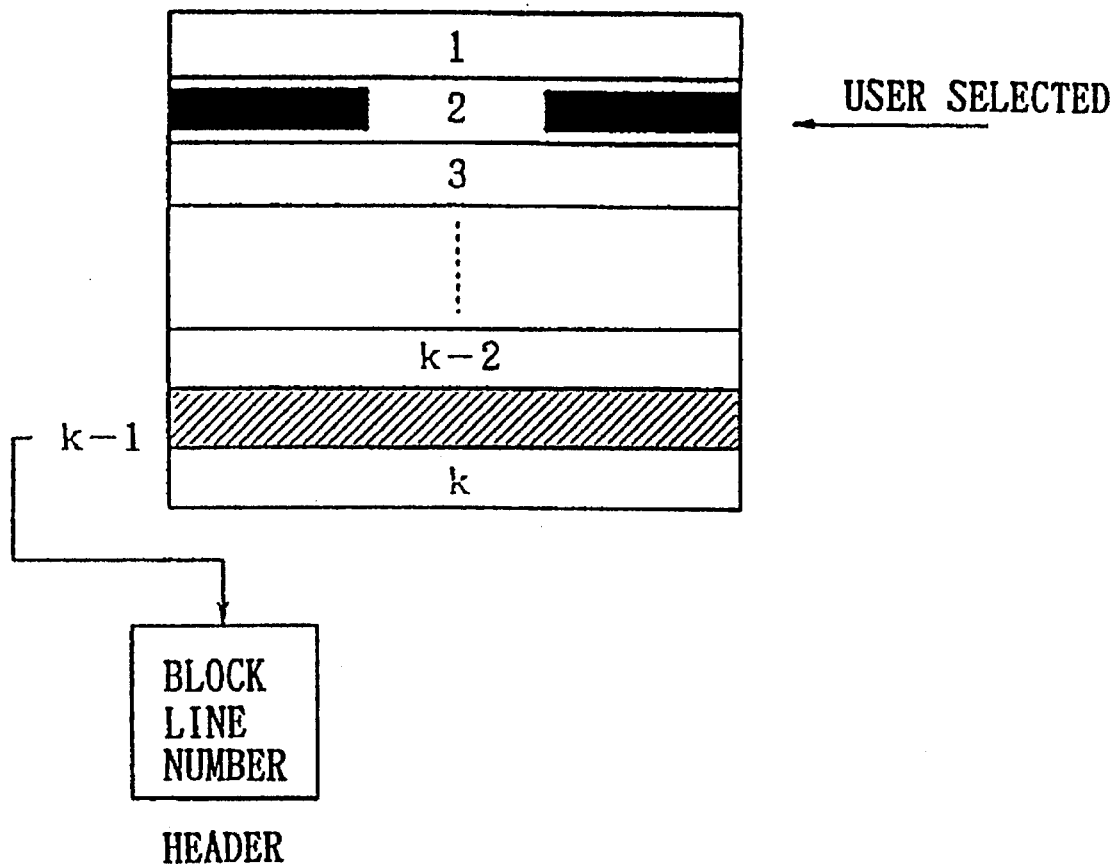
FIG. 22 is a figure for explaining the display position specifying signal input to the mixer 92 in FIG. 16.

Further, on the one hand, the control signal for changing the display position is also input to the mixer 92. For instance, as shown in FIG. 22, when data is transmitted, the k-1-th block line is specified as the display position, but the mixer 92 includes a counter and counts the input horizontal synchronization signals, and superimposes the caption data on the background video image when the count value equals a value corresponding to this block line number.

On the other hand, if the user specifies a desired block line, the caption is superimposed on the background video image when the count value of the above described counter reaches a value corresponding to the value specified by the user. Thus, even if it is specified that the caption be superimposed on the k-1-th block line as shown in FIG. 22, the user can cause the caption to be displayed, for instance, on the second block line, as necessary. In addition, in the above embodiment, a DPCM circuit 15 is provided on the coding side and an IDPCM circuit 90 is provided on the decoding side, but it may be allowed that the output of the quantizer circuit 14 is directly coded in the run length coding circuit 16 on the coding side while, on the decoding side, the output of the inverse run length circuit 89 is directly input to the inverse quantizer circuit 91 for caption data and the output of the inverse run length circuit 89 is directly input to the mixer 92 for key data.

Figure 23:
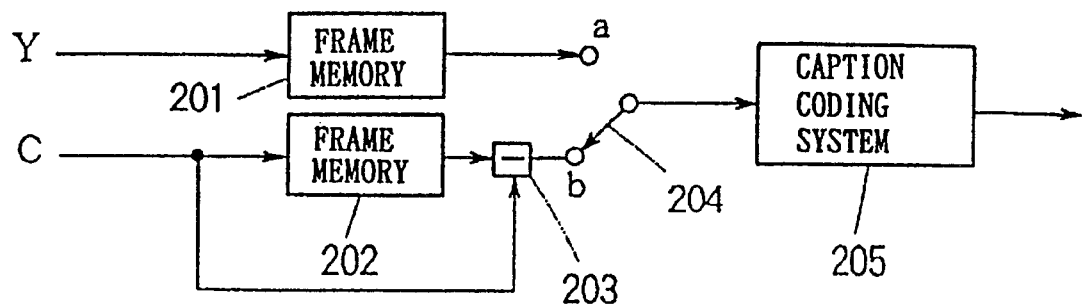
FIG. 23 is a block diagram showing another structural example of the caption data coding system to which the caption data coding method of the present invention is applied.

FIG. 23 shows an embodiment of the coding system for implementing the coding of the wipe bar without using a chroma vector. In this embodiment, the brightness data of the caption is supplied to frame memory 201 and chroma data is supplied to frame memory 202, and they are stored in the respective memories. Then, a subtracter circuit 203 subtracts the data stored in frame memory 202 from the chroma data of a newly supplied frame, and outputs the difference. A switch 204 is switched to the contact "a" side or contact "b" side at a predetermined timing to select the brightness data read from frame memory 201 or the chroma data output from the subtracter circuit 203, and supplies it to a caption decoder 205. The caption decoder 205 has, for instance, a construction substantially similar to the construction of the caption coding system 7 in FIG. 1 except for the threshold circuit 21, end detection circuit 22, and vector generator circuit 23.

Figure 24:
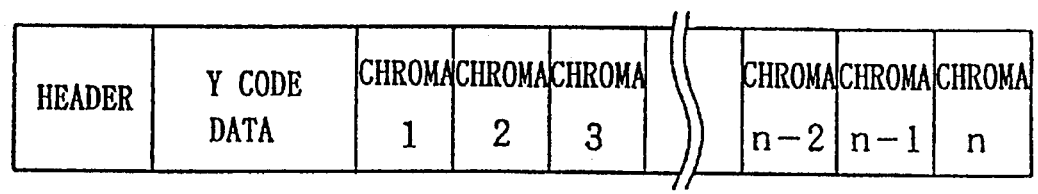
FIG. 24 is a figure for explaining the format in the output of the caption coding system 205 in FIG. 23.

The format of the data output from the caption decoder 205 and transmitted in this way is as shown in FIG. 24. That is, a header is placed at the beginning of it, and the coded data of brightness data follows. As many items of chroma data as the number of frames (for fields) to be wiped are subsequently located.

Figure 25:
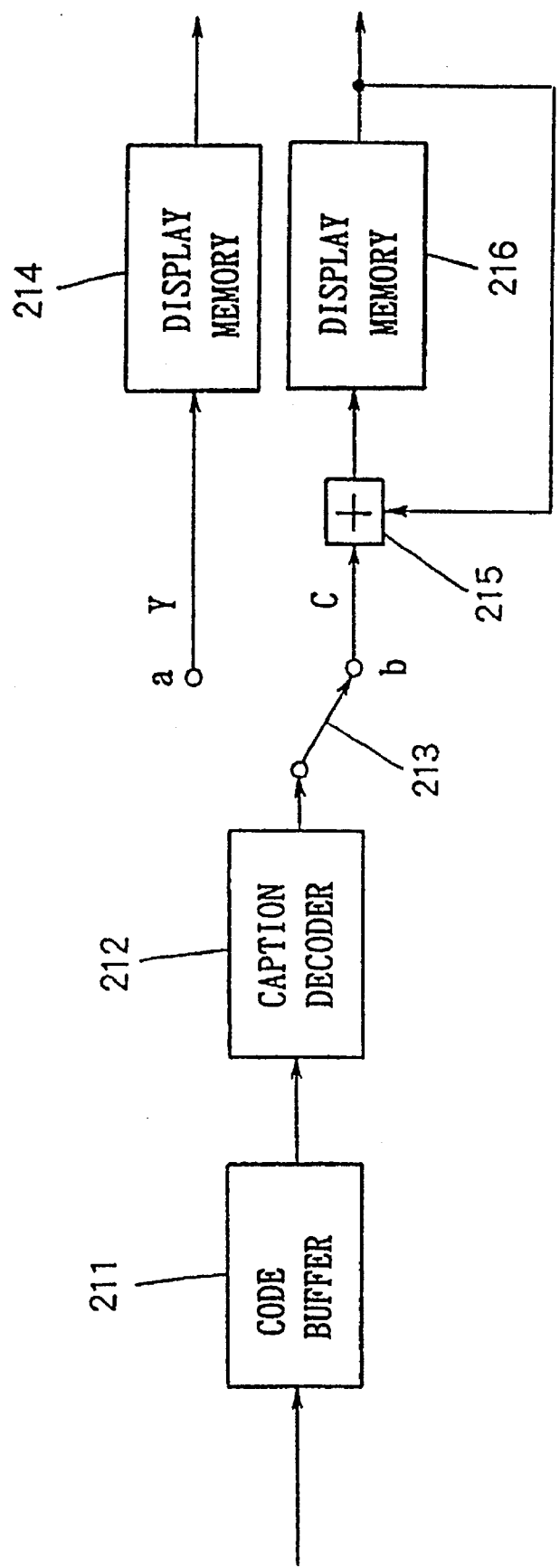
FIG. 25 is a block diagram showing a structural example of an embodiment of the decoding system for coding the output of the embodiment of FIG. 23.
Figure 26:
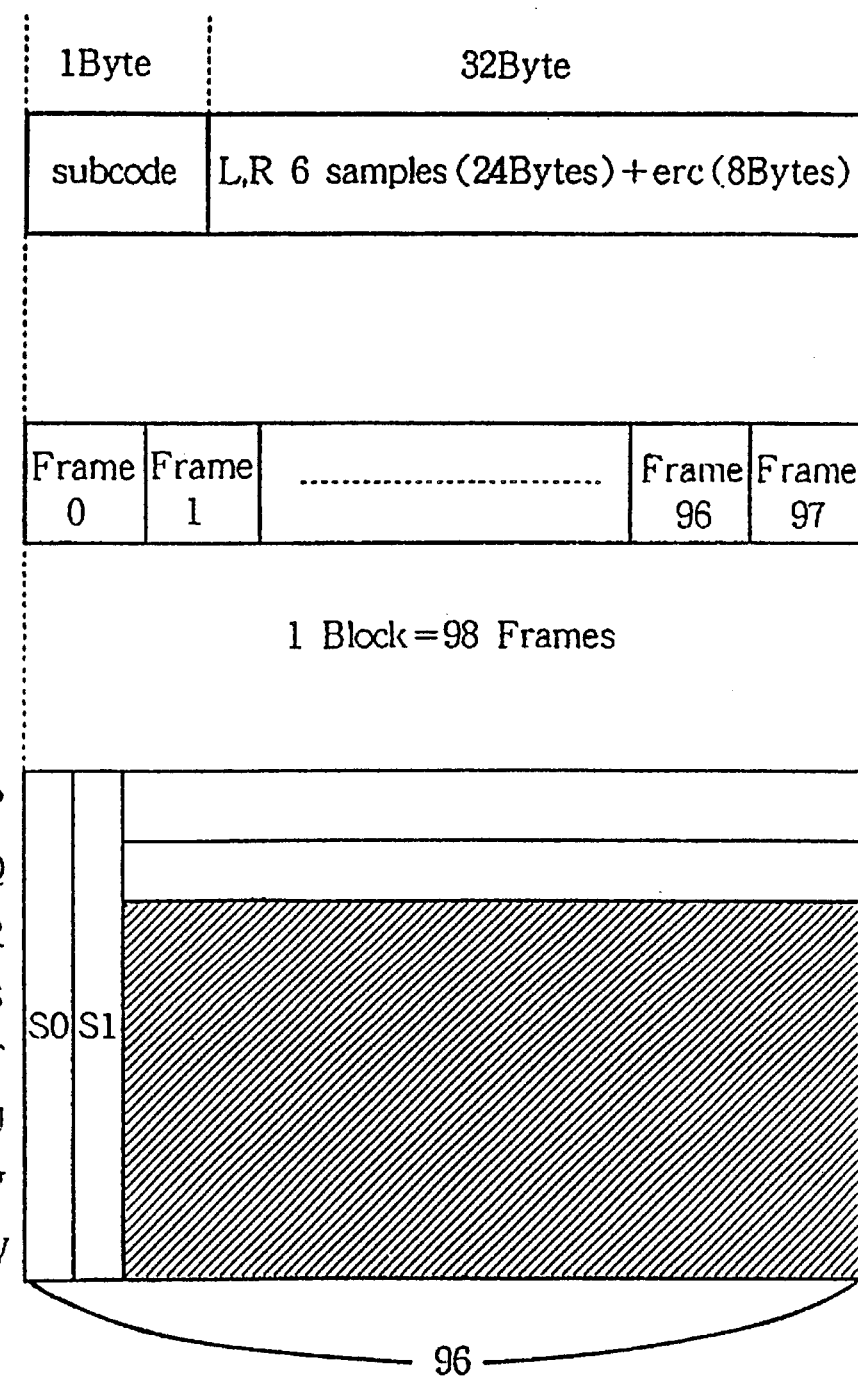
FIG. 26 is a figure for explaining the format of the conventional subcode.
Figure 27:
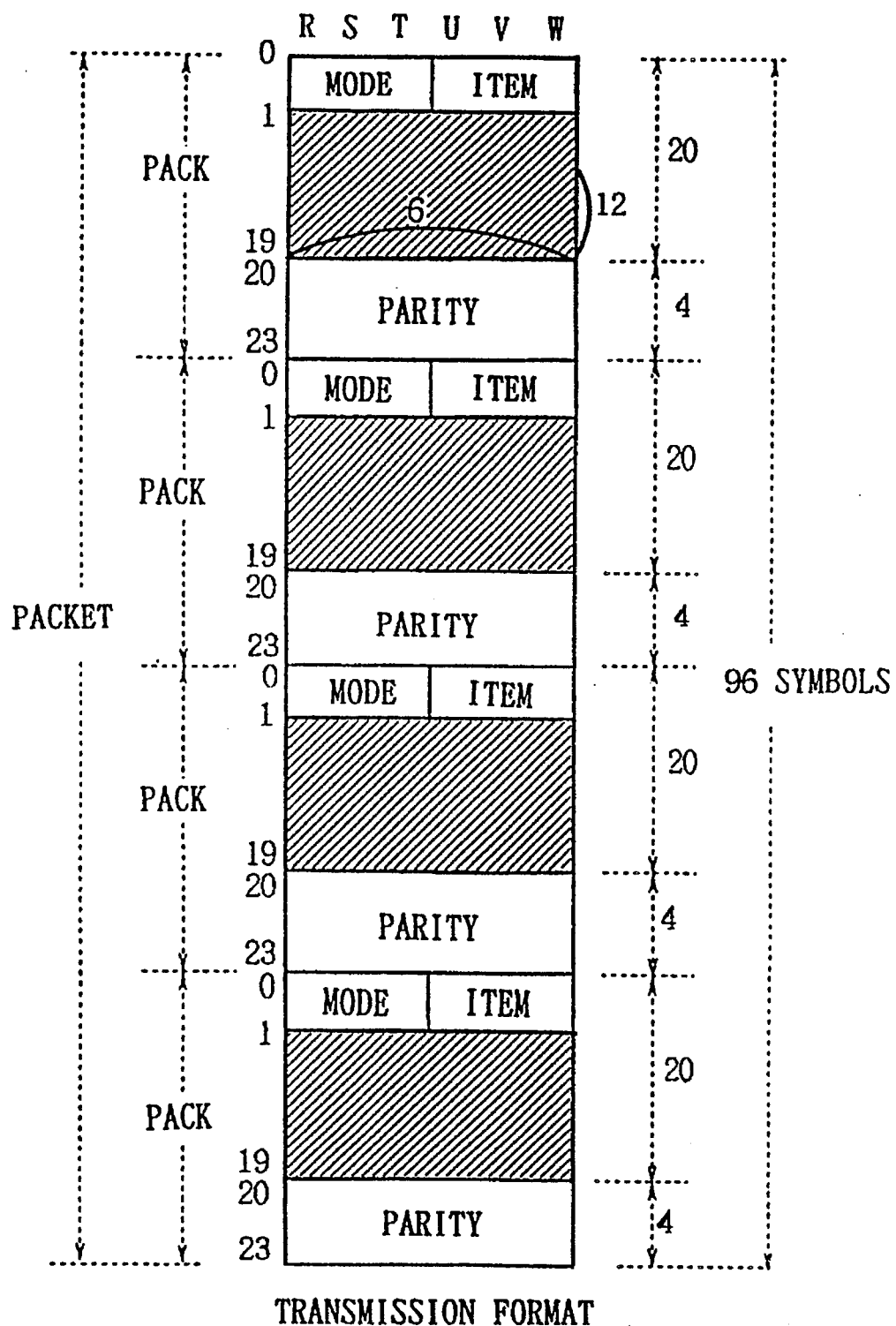
FIG. 27 is a figure showing the transmission format of the conventional subcode.

Data in such a format is decoded by a decoding system as shown in FIG. 25. That is, in this embodiment, input data is temporarily stored in a code buffer 211, and thereafter supplied to a caption decoder 212. The caption decoder 212 decodes the input data.

The brightness data among the data decoded by the caption decoder 212 is supplied to a display memory 214 via contact "a" of a switch 213 and stored therein. Further, the chroma data is provided to an adder circuit 215 via contact "b" of the switch 213, where it is added to the data for the preceding frame stored in a display memory 216. Then, the sum data is again supplied to the display memory 216. The chroma data for each frame is thus stored in the display memory 216. Then, the data stored in the display memories 214 and 216 is read at a predetermined timing, and output to an displayed on a CRT, LCD, and the like (not shown).

In addition, although in the above embodiments, caption data for one channel (one language) is made to correspond to the background video image for one channel, a plurality of caption data (of a plurality of languages) may be made to correspond to one background image, or a plurality of caption data may be made to correspond to a plurality of background video images.

As described above, in accordance with the caption data coding method and system of the present invention, quantized caption data and key data are transmitted as predetermined bits. Further, in accordance with the transmission method and system of the present invention, key data is generated which corresponds to the attenuation rate of a video image when a caption to be superimposed on the video image for display is superimposed on the video image, and the key data is transmitted. Moreover, in accordance with the coding method and system of the present invention, key data is generated which corresponds to the attenuation rate of a video image when a caption to be superimposed on the video image for display is superimposed on the video image, the key data is quantized, and the quantized key data is transmitted as predetermined bits. In consequence, a high-quality caption can be displayed at high speed, as needed, with a simple construction and without degrading the quality of the background video image.

Furthermore, in accordance with the caption data decoding method and system of the present invention, the attenuation rate of the video image is controlled according to the value of key data. Further, in accordance with the decoding method and system of the present invention, the attenuation rate of the video image is made minimum when the key data is maximum or minimum data, the attenuation rate of the video image is made maximum when the key data is minimum or maximum data, and when the key data is a value between the minimum and the maximum, the attenuation rate of the video image is made to correspond to the magnitude of the value. Consequently, the background video image and caption can be displayed so that they look natural and easy to view. As a result, a high-quality caption can be displayed at high speed, as needed.

In addition, in accordance with the recording medium of the present invention, since the quantized key data is recorded as predetermined bits, a high-quality caption can be displayed at high speed, as needed, with a simple construction and without degrading the quality of the background video image.

Industrial Applicability

The caption coding method, caption coding system, data transmission method, and data transmission system of the present invention can be used with a disk production apparatus for producing disks on which movies are recorded, or karaoke disks. Also, the caption coding method and system of the present invention can be utilized for the distribution apparatus for CATV, satellite broadcasting, and so-called video on-demand systems.

Moreover, the recording medium of the present invention can be used as commercial movie disks for general consumers and movie disks for rental dealers. Also, the recording medium of the present invention can be utilized for karaoke disks for the karaoke systems of general consumers or karaoke shops.

Further, the caption decoding method, caption coding method, video image control method, and video image control system can be utilized for a reproduction system for reproducing movie disks or karaoke disks. In addition, the caption decoding method, caption coding method, video image control method, and video image control system can be used with the receiving system for CATV, satellite broadcasting, so-called video on-demand systems, and the like.

I claim:

1. A caption coding method for coding a caption, represented by caption data, to be superimposed on a video image for display, comprising:

coding the caption data representing the caption to be superimposed on the video image for display;

coding key data to have a value corresponding to one of a maximum attenuation rate, a minimum attenuation rate, and one or more intermediate attenuation rates between the maximum attenuation rate and the minimum attenuation rate, of portions of the video image in a vicinity of the caption; and combining the coded caption data and the coded key data with video image data that represents the video image, to generate a combined image signal.

2. The caption coding method according to claim 1, and further comprising:

quantizing the caption data and the key data.

3. The caption coding method according to claim 1, and further comprising:

expressing each of the caption data and the key data by a predetermined number of bits, and selectively coding one of the caption data and the key data, but not both, into a predetermined portion of the combined image signal.

4. The caption coding method according to claim 1, and further comprising:

coding the caption data in a squeeze mode when the video image data is coded in the squeeze mode.

5. The caption coding method according to claim 1, and further comprising:

compressively coding the video image, to achieve the video image data, at a rate according to an amount of code generated for the caption data and key data.

6. The caption coding method according to claim 1, and further comprising:

coding brightness data of the caption as at least a portion of the caption data by calculating a difference of the color data of the caption for a first field or frame of the video image relative to the color data of the caption for a second field or frame of the video image to determine color difference data, and coding the color difference data.

7. The caption coding method according to claim 1, wherein the step of coding the color difference data includes:

combining the color difference data of the caption with an offset value corresponding to a coordinate position, of the video image, of a change point of the color difference data, to determine a chroma vector, and coding the chroma vector.

8. The caption coding method according to claim 7, and further comprising:

multiplexing the offset value of the brightness data of said caption into the combined image signal.

9. The caption coding method according to claim 1, and further comprising:

combining position data, representing a position of the video image at which the caption is to be superimposed, with the caption data.

10. The caption coding method according to claim 1, and further comprising:

combining a page end word representing the page end of the caption, for each page of the caption.

11. The caption coding method according to claim 1, and further comprising:

adding a code for error detection for each page of the caption.

12. The caption coding method according to claim 1, wherein the caption data and key data are coded using at least one of DPCM, run length coding, or variable-length coding.

13. A caption decoding method for decoding coded data, comprising:

generating a signal representing a caption, based on a coded caption data portion of the coded data, to be superimposed onto a video image; and attenuating the video image in a vicinity of the caption at one of a maximum rate, a minimum rate, and one or more intermediate rates, based on a coded key data portion of the coded data.

14. The caption decoding method according to claim 13, and further comprising:

inverse-quantizing the coded caption data.

15. The caption decoding method according to claim 13, and further comprising:

separating a coded video image signal from the coded data, and decoding the coded video image signal to generate the video image.

16. The caption decoding method according to claim 13, and further comprising:

decoding coded brightness data from the coded data, and adding coded color difference data for a predetermined field or frame to decode color difference data, to thereby generate a color difference of the caption.

17. The caption decoding method according to claim 13, and further comprising:

decoding coded brightness data, and decoding coded color difference data based on an offset value of a predetermined color difference data and a chroma vector corresponding to a coordinate position, of the video image, of a change point of the color difference data of the caption, to thereby generate a color difference of the caption.

18. The caption decoding method according to claim 17, and further comprising:

adding an offset value of the brightness data of the coded data to the decoded brightness data based on the chroma vector.

19. The caption decoding method according to claim 13, and further comprising:

controlling the position of the caption on the video image based on position data in the coded data.

20. The caption decoding method according to claim 13, and further comprising:

storing the coded caption data and the coded key data in a memory; and reading and decoding the coded caption data and the coded key data stored in the memory.

21. The caption decoding method according to claim 20, and further comprising:

performing bank switching of the memory based on a page end word in the transmitted coded data representing the page end of the caption of the coded data.

22. The caption decoding method according to claim 13, and further comprising:

performing error detection using a code for error detection provided for each page of the caption and, when an error is detected, stopping the decoding of the coded data of the page of the caption including the detected error.

23. The caption decoding method according to claim 13, and further comprising:

decoding the caption data and key data using at least one of variable-length decoding, run length decoding, or IDPCM.

24. The caption decoding method according to claim 19, and further comprising:

changing the display position of the caption to a position different from a position indicated by the position data.

25. A data transmission method for transmitting data associated with a caption to be superimposed on a video image for display, comprising:

generating key data representing one of a maximum attenuation rate, a minimum attenuation rate, and one or more intermediate attenuation rates between the maximum attenuation rate and the minimum attenuation rate, of the video image in the vicinity of the caption;

combining the key data with caption data that represents the caption and with a video image signal to generate a combined image signal;

transmitting the combined image signal.

26. The data transmission method according to claim 25, and further comprising:

quantizing the key data; and transmitting the quantized key data as bits at predetermined positions in the combined image signal.

27. A video image control method for superimposing a caption on a video image for display, comprising:

receiving coded key data representing one of a maximum attenuation rate, a minimum attenuation rate, and one or more intermediate attenuation rates between the maximum attenuation rate and the minimum attenuation rate, of the video image in a vicinity of the caption;

decoding the coded key data; and attenuating the video image in the vicinity of the caption at a rate indicated by the decoded key data.

28. A video image control method for superimposing a caption on a video image for display, comprising:

receiving coded key data representing an attenuation rate of the video image in a vicinity of the caption;

decoding the coded key data;

attenuating the video image in the vicinity of the caption at a rate indicated by the decoded key data;

making the attenuation rate of said video image minimum when said decoded key data is minimum data;

making the attenuation rate of said video image maximum when said key data is maximum data; and making the attenuation rate of said video image correspond to the magnitude of said value when said key data is a value between the minimum and the maximum.

29. A recording medium having a video image recorded thereon, the recording medium having recorded thereon coded caption data for controlling a display apparatus to display a caption superimposed on a video image and coded key data for controlling the display apparatus to attenuate the video image at one of a maximum rate, a minimum rate, and one or more intermediate rates between the maximum rate and the minimum rate, in a vicinity of the caption.

30. The recording medium according to claim 29, having further recorded thereon an offset value of predetermined color difference data, and a chroma vector corresponding to a coordinate position, of the video image, of a change point of a color difference of the caption.

31. The recording medium according to claim 30, having further recorded thereon an offset value of brightness data of the caption.

32. The recording medium according to claim 29, having further recorded thereon position data for controlling a position of the video image at which the display apparatus is to display the caption.

33. The recording medium according to claim 29, having further recorded thereon a page end word representing a page end of the caption.

34. The recording medium according to claim 29, having further recorded thereon a code for error detection for each page of the caption.

35. The recording medium according to claim 29, wherein the coded caption data includes brightness data representing the brightness of the caption and color difference data differentiated for a predetermined field or frame of the caption.

36. A caption coding system for coding a caption to be superimposed on a video image for display, comprising:

caption data coding means for coding caption data representing a caption to be superimposed on a video image for display, key data coding means for coding key data representing one of a maximum attenuation rate, a minimum attenuation rate, and one or more intermediate attenuation rates between the maximum attenuation rate and the minimum attenuation rate, of the video image in a vicinity of the caption; and combining means for combining the coded caption data and the coded key data with video image data that represents the video image, to generate a combined image signal.

37. The caption coding system according to claim 36, wherein the caption data coding means and the key data coding means includes quantizing means for quantizing the caption data and the key data.

38. The caption coding system according to claim 36, wherein the caption data coding means and the key data coding means expresses each of the caption data and the key data by a predetermined number of bits and selectively codes one of the caption data and the key data, but not both, into a predetermined portion of the combined image signal.

39. The caption coding system according to claim 36, wherein the coding means codes the caption data in a squeeze mode when the video image is coded in the squeeze mode.

40. The caption coding system according to claim 36, and further comprising:

image coding means for compressively coding the video image according to an amount of code generated for the caption data and key data.

41. The caption coding system according to claim 36, wherein the caption data coding means codes brightness data of the caption as at least a portion of the caption data, and calculates a difference of color difference data of the caption for a predetermined field or frame of the video image, and codes the difference.

42. The caption coding system according to claim 36, wherein the caption data coding means codes brightness data of the caption as the caption data, and the coding means includes combining means for combining color difference data of the caption with the coded brightness data of the caption as a chroma vector corresponding to a predetermined offset value and a coordinate position, of the video image, of a change point of the color difference data of the caption.

43. The caption coding system according to claim 42, wherein the combining means also combines an offset value of the brightness data of the caption with the coded brightness data of the caption.

44. The caption coding system according to claim 36, wherein the coding means includes combining means for combining position data representing a position of the video image at which the caption is to be displayed, with the coded caption data and the coded key data.

45. The caption coding system according to claim 36, wherein the coding means includes combining means for combining a page end word representing the page end of the caption for each page of the caption.

46. The caption coding system according to claim 36, wherein the coding means includes combining means for adding a code for error detection for each page of the caption.

47. The caption coding system according to claim 36, wherein the caption data coding means codes the caption data and the key data coding means codes the key data using at least one of DPCM, run length coding, or variable-length coding.

48. A caption decoding system for decoding a coded caption, comprising:

caption generation means for generating a signal representing a caption based on the coded caption data of coded data; and video image control means for attenuating the video image on which the caption is to be superimposed, at one of a maximum rate, a minimum rate, and one or more intermediate rates between the maximum rate and the minimum rate, based on coded key data of the coded data.

49. The caption decoding system according to claim 48, and further comprising:

inverse quantizing means for inverse-quantizing the coded caption data.

50. The caption decoding system according to claim 48, and further comprising:

separation means for separating a coded video image signal from the coded data; and decoding means for decoding the coded video image signal to generate the video image.

51. The caption decoding system according to claim 48, wherein the caption generation means decodes coded brightness data, and adds a coded color difference data for a predetermined field or frame to decode the color difference data, to thereby generate the caption.

52. The caption decoding system according to claim 48, wherein the caption generation means decodes coded brightness data, and decodes coded color difference data based on an offset value of a predetermined color difference data and a chroma vector corresponding to a coordinate position, of the video image, of a change point of the color difference data, thereby generating the caption.

53. The caption decoding system according to claim 52, wherein the caption generation means adds the offset value of the brightness data of the transmitted coded data to the decoded brightness data based on the chroma vector.

54. The caption decoding system according to claim 48, and further comprising:

control means for controlling a display position of the caption based on position data of the coded data.

55. The caption decoding system according to claim 48, and further comprising:

memory means for storing the coded caption data and the coded key data, wherein the caption generation means reads and decodes the coded caption data and the coded key data stored in the memory.

56. The caption decoding system according to claim 55, and further comprising:

memory control means for switching banks of the memory means based on a page end word representing the page end of a caption of the transmitted coded data.

57. The caption decoding system according to claim 48, and further comprising:

error detection means for performing error detection using a code for error detection provided for each page of the caption and, when an error is detected, stopping the decoding of the coded data in a page of the caption which contains the detected error.

58. The caption decoding system according to claim 48, wherein the caption generation means decodes the caption data and key data using at least one of variable-length decoding, run length decoding, or IDPCM.

59. The caption decoding system according to claim 54, and further comprising:

control means for changing a display position of the caption to a position different from a position indicated by the position data.

60. A data transmission system for transmitting data associated with a caption to be superimposed on a video image for display, comprising:

means for generating key data representing one of a maximum attenuation rate, a minimum attenuation rate, and one or more intermediate attenuation rates between the maximum attenuation rate and the minimum attenuation rate, of the video image in a vicinity of the caption when the caption is superimposed on the video image; and transmission means for transmitting the key data as at least a portion of a transmission signal.

61. The data transmission system according to claim 60, wherein the transmission means quantizes the key data, and transmits the quantized key data as predetermined portions of the transmission signal.

62. A video image control system for superimposing a caption on a video image for display, comprising:

means for receiving a coded key data representing one of a maximum attenuation rate, a minimum attenuation rate, and one or more intermediate attenuation rates between the maximum attenuation rate and the minimum attenuation rate, of the video image in a vicinity of the caption when the caption is superimposed on the video image;

decoding means for decoding the coded key data; and attenuating means for attenuating the video image based on the decoded key data.

63. A video image control system for superimposing a caption on a video image for display, comprising:

means for receiving a coded key data representing an attenuation rate of the video image in a vicinity of the caption when the caption is superimposed on the video image;

decoding means for decoding the coded key data; and attenuating means for attenuating the video image based on the decoded key data wherein the attenuating means makes the attenuation rate of said video image minimum when the decoded key data is minimum data, makes the attenuation rate of the video image maximum when the key data is maximum data and, makes the attenuation rate of the video image correspond to the magnitude of the value, when the key data is a value between the minimum and the maximum.

64. A recording medium having a video image signal recorded thereon for controlling a display apparatus to display the video image signal, the recording medium being created by:

coding a video image;

coding caption data representing a caption to be superimposed on the video image for display;

coding key data representing one of a maximum attenuation rate, a minimum attenuation rate, and one or more intermediate attenuation rates between the maximum attenuation rate and the minimum attenuation rate, of the video image in a vicinity of the caption when the caption is superimposed on the video image by the display apparatus; and recording the coded video image, caption data, and key data onto the recording medium.

65. A caption coding method for coding a caption, represented by caption data, to be superimposed on a video image for display, comprising:

coding the caption data representing the caption to be superimposed on the video image for display;

coding key data to have a value corresponding to an attenuation rate of portions of the video image in a vicinity of the caption;

combining the caption data and the key data with video image data that represents the video image, to generate a combined image signal wherein, in the caption data coding step and the key data coding step, each of the caption data and the key data are expressed by a predetermined number of bits and one of the caption data and the key data, but not both, is selectively coded into a predetermined portion of the combined image signal.

66. A caption coding method for coding a caption, represented by caption data, to be superimposed on a video image for display, comprising:

coding the caption data representing the caption to be superimposed on the video image for display, including combining color difference data of the caption with an offset value corresponding to the coordinate position, of the video image, of a change point of the color difference data, to determine a chroma vector, and coding the chroma vector into the caption data;

coding key data to have a value corresponding to an attenuation rate of portions of the video image in a vicinity of the caption; and combining the caption data and the key data with video image data that represents the video image, to generate a combined image signal.

67. The caption coding method of claim 66, and further comprising:

multiplexing the offset value of the brightness data of the caption into the combined image signal.

68. A caption decoding method for decoding transmitted coded data, comprising:

generating a signal representing a caption, based on a coded caption data portion of the transmitted coded data, to be superimposed onto a video image, including decoding coded brightness data, and decoding coded color difference data based on an offset value of a predetermined color difference data and a chroma vector corresponding to a coordinate position, of the video image, of a change point of the color difference data of the caption, to thereby generate a color difference of the caption; and attenuating the video image in a vicinity of the caption at one of a maximum rate, a minimum rate, and one or more intermediate rates, based on a coded key data portion of the transmitted coded data.

69. The caption decoding method according to claim 68, and further comprising:

adding an offset value of the brightness data of the transmitted coded data to the decoded brightness data based on the chroma vector.

70. A caption coding system for coding a caption to be superimposed on a video image for display, comprising:

caption data coding means for coding caption data representing a caption to be superimposed on a video image for display, key data coding means for coding key data representing an attenuation rate of portions of the video image in a vicinity of the caption; and combining means for combining the coded caption data and the coded key data with video image data that represents the video image, to generate a combined image signal, wherein the caption data coding means and the key data coding means selectively expresses each of the caption data and the key data by a predetermined number of bits and codes one of the caption data and the key data, but not both, into a predetermined portion of the combined image signal.

71. A caption coding system for coding a caption to be superimposed on a video image for display, comprising:

caption data coding means for coding caption data representing a caption to be superimposed on a video image for display, key data coding means for coding key data representing an attenuation rate of portions of the video image in a vicinity of the caption; and combining means for combining the coded caption data and the coded key data with video image data that represents the video image, to generate a combined image signal, wherein the caption data coding means codes brightness data of the caption as the caption data, and the coding means includes combining means for combining color difference data of the caption with the coded brightness data of the caption as a chroma vector corresponding to a predetermined offset value and a coordinate position, of the video image, of a change point of the color difference data of the caption.

72. The caption coding system according to claim 71, wherein the combining means also combines an offset value of the brightness data of the caption with the coded brightness data of the caption.

73. A caption decoding system for decoding a coded caption, comprising:

caption generation means for generating a signal representing a caption based on the coded caption data of coded data; and video image control means for attenuating the video image on which the caption is to be superimposed, at one of a maximum rate, a minimum rate, and one or more intermediate rates between the maximum rate and the minimum rate, based on coded key data of the coded data, wherein the caption generation means decodes coded brightness data, and decodes coded color difference data based on an offset value of a predetermined color difference data and a chroma vector corresponding to a coordinate position, of the video image, of a change point of the color difference data, thereby generating the caption.

74. The caption decoding system according to claim 73, wherein the caption generation means adds the offset value of the brightness data of the transmitted coded data to the decoded brightness data based on the chroma vector.

* * * * *